(12) United States Patent
Wade et al.

(10) Patent No.: US 9,042,042 B2
(45) Date of Patent: May 26, 2015

(54) LENS DRIVE DEVICE

(75) Inventors: Tatsuki Wade, Nagano (JP); Katsushige Yanagisawa, Nagano (JP); Shinji Minamisawa, Nagano (JP); Tadashi Takeda, Nagano (JP); Kiyoshi Miyazaki, Nagano (JP); Hisahiro Ishihara, Nagano (JP)

(73) Assignee: NIDEC SANKYO CORPORATION (JP)

( * ) Notice: Subject to any disclaimer, the term of this patent is extended or adjusted under 35 U.S.C. 154(b) by 237 days.

(21) Appl. No.: 13/510,751

(22) PCT Filed: Nov. 13, 2010

(86) PCT No.: PCT/JP2010/070244
§ 371 (c)(1),
(2), (4) Date: May 18, 2012

(87) PCT Pub. No.: WO2011/062123
PCT Pub. Date: May 26, 2011

(65) Prior Publication Data
US 2012/0229926 A1 Sep. 13, 2012

(30) Foreign Application Priority Data

Nov. 18, 2009 (JP) ................................. 2009-263136
Nov. 30, 2009 (JP) ................................. 2009-271338

(51) Int. Cl.
*G02B 7/02* (2006.01)
*G03B 5/00* (2006.01)
(Continued)

(52) U.S. Cl.
CPC .. *G03B 5/00* (2013.01); *G02B 7/08* (2013.01); *G02B 27/646* (2013.01)

(58) Field of Classification Search
CPC .......... G02B 27/646; G02B 7/08; G03B 5/00
USPC .......... 359/823–824, 554, 557, 694, 696, 814
See application file for complete search history.

(56) References Cited

U.S. PATENT DOCUMENTS 5,734,490 A * 3/1998 Rabarot et al. ............. 359/210.1
7,102,836 B2 * 9/2006 Kim et al. ..................... 359/813
(Continued)

FOREIGN PATENT DOCUMENTS

| JP | 62-138319 U | 9/1987 |
| JP | 11-168650 A | 6/1999 |

(Continued)

OTHER PUBLICATIONS

International Search Report corresponding to Application No. PCT/JP2010/070244, Date of Mailing: Dec. 14, 2010, with English translation.

*Primary Examiner* — Scott J Sugarman
*Assistant Examiner* — Vipin Patel
(74) *Attorney, Agent, or Firm* — Cantor Colburn LLP

(57) ABSTRACT

The lens drive device is equipped with a first supporting body that holds the lens and is movable in the direction of the optical axis, a second supporting body that holds the first supporting body, a fixed body that holds the second supporting body in a manner enabling movement in directions that are roughly orthogonal to the optical axis direction, a first drive mechanism for driving the first supporting body, a second drive mechanism for driving the second supporting body in a first direction, and a third drive mechanism for driving the second supporting body in a second direction. The first supporting body is supported by the second supporting body by means of first supporting members which are formed from an elastic material; and the second supporting body is supported by the fixed body by means of second supporting members, which are formed from an elastic material.

25 Claims, 12 Drawing Sheets

(51) Int. Cl.
    *G02B 7/08*     (2006.01)
    *G02B 27/64*     (2006.01)

(56) References Cited

U.S. PATENT DOCUMENTS

| | | | |
|---|---|---|---|
| 2002/0054559 A1* | 5/2002 | Choi | 369/244 |
| 2007/0046109 A1* | 3/2007 | Ho et al. | 310/12 |
| 2009/0250488 A1* | 10/2009 | Dubach | 222/83 |
| 2011/0096178 A1 | 4/2011 | Ryu et al. | |
| 2011/0176046 A1 | 7/2011 | Hu et al. | |
| 2012/0154614 A1 | 6/2012 | Moriya et al. | |
| 2012/0229901 A1 | 9/2012 | Moriya et al. | |

FOREIGN PATENT DOCUMENTS

| | | |
|---|---|---|
| JP | 2005-338298 A | 12/2005 |
| JP | 2007-93953 A | 4/2007 |
| JP | 2008-58659 A | 3/2008 |
| JP | 2009-229789 a | 10/2009 |
| JP | 2011-65140 A | 3/2011 |
| JP | 2011-85666 A | 4/2011 |
| JP | 2011-128583 A | 6/2011 |
| JP | 2011-521285 A | 7/2011 |
| KR | 100918816 B1 | 9/2009 |
| KR | 1020080044348 * | 9/2009 |
| WO | 2006/046350 A1 | 4/2006 |

* cited by examiner

Fig. 1
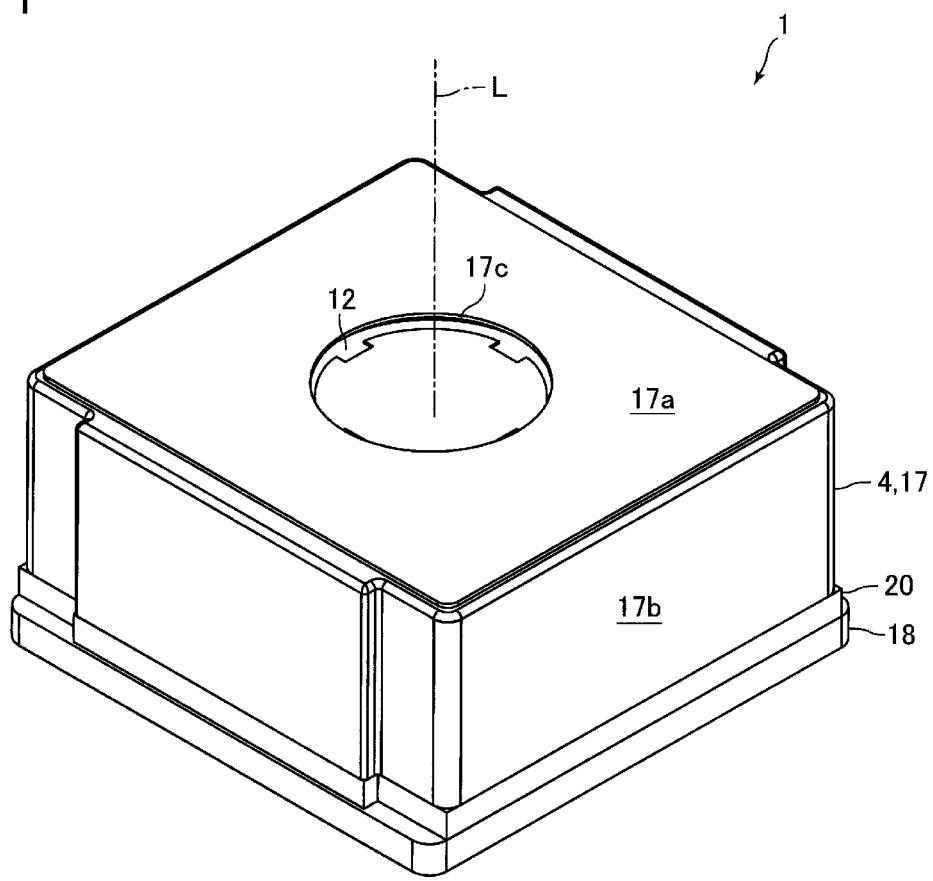
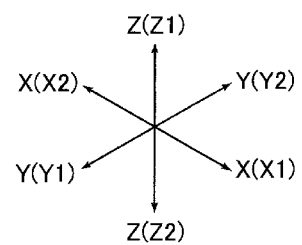

Fig. 3
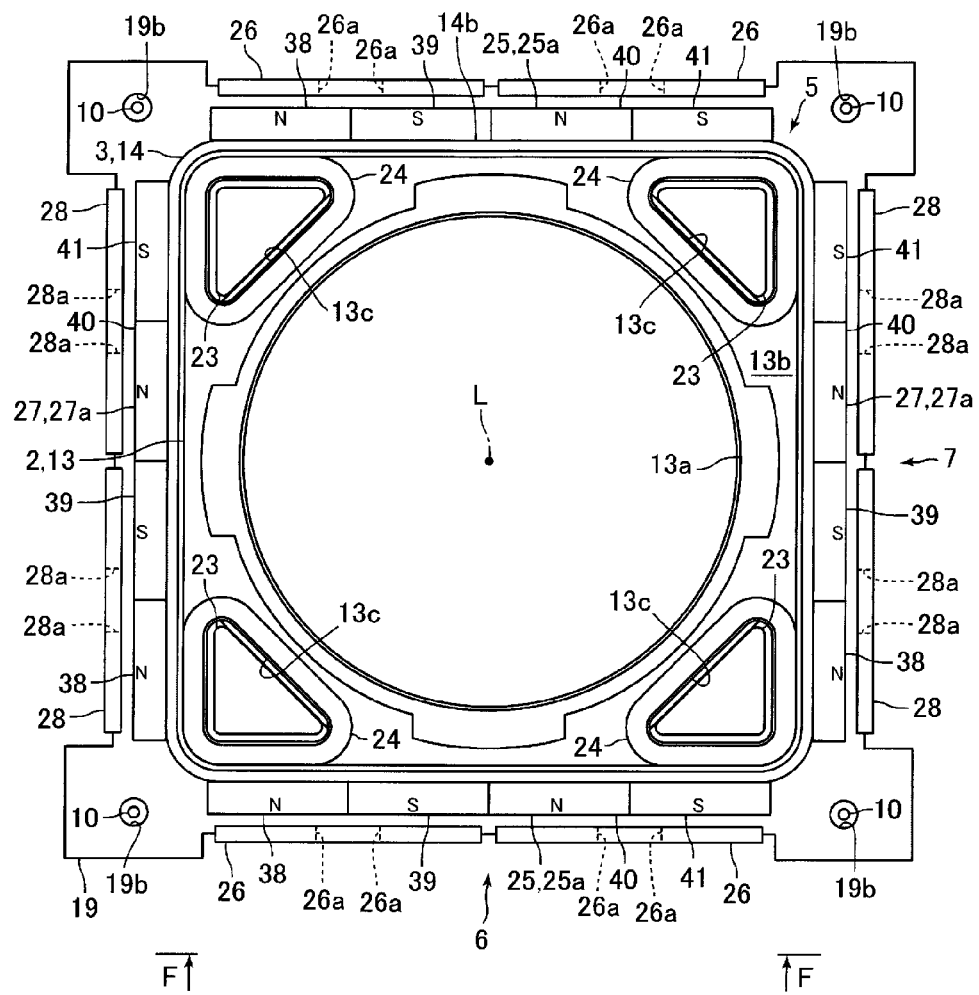
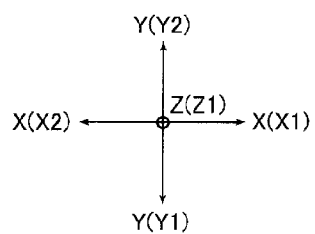

Fig. 5
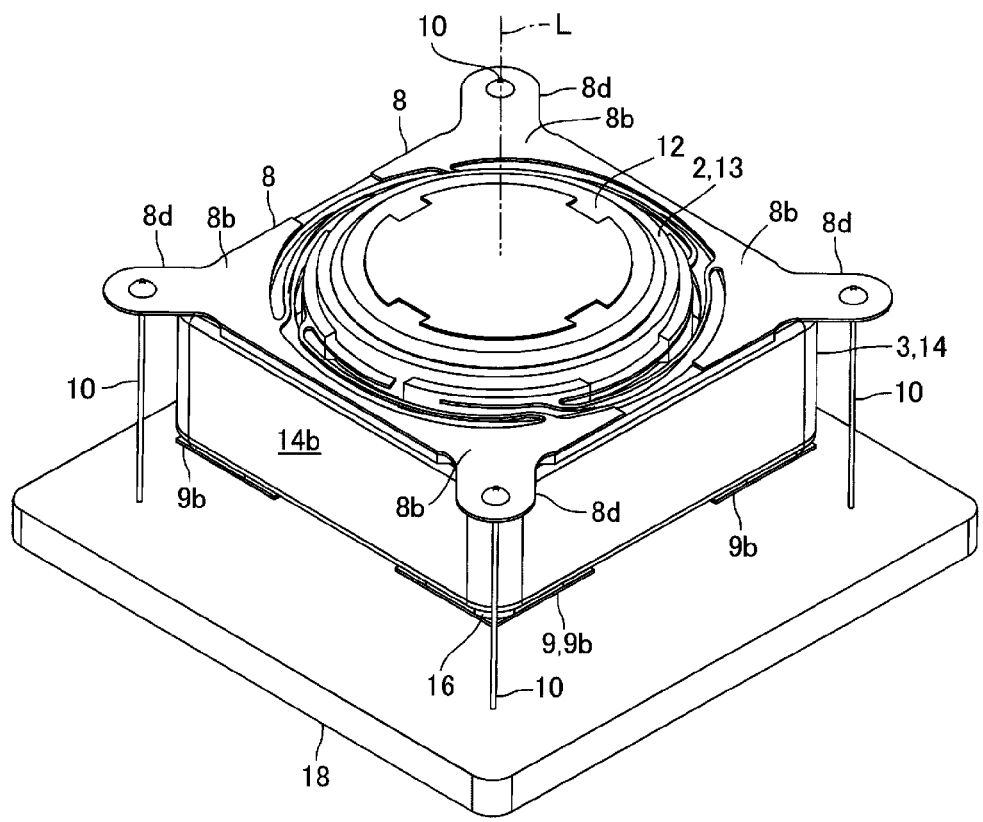
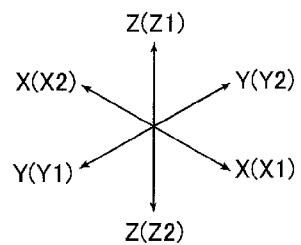

LENS DRIVE DEVICE

CROSS REFERENCE TO RELATED APPLICATIONS

This is a U.S. national stage of International Application No. PCT/JP2010/070244, filed on Nov. 13, 2010. Priority under 35 U.S.C. §119(a) and 35 U.S.C. §365(b) is claimed from Japanese Applications Nos. 2009-263136, filed Nov. 18, 2009; and 2009-271338, filed Nov. 30, 2009, the disclosures of which are also incorporated herein by reference.

TECHNICAL FIELD

The present invention relates to a lens drive device which is used in a relatively small camera that is mounted on a cellular phone or the like.

BACKGROUND

Conventionally, a lens drive device for driving a photographing lens of a camera which is mounted on a cellular phone or the like has been known that includes a movable lens body, which holds a plurality of lenses and is movable in an optical axis direction, and a fixed body which movably holds the movable lens body through two plate springs (see, for example, Patent Literature 1). In the lens drive device described in Patent Literature 1, a drive coil is wound around an outer peripheral face of a cylindrical tube-like sleeve which structures the movable lens body. Further, in the lens drive device, four magnets are disposed so as to face an outer peripheral face of the drive coil.

[PTL 1] Japanese Patent Laid-Open No. 2008-58659

When a camera which is mounted on a portable device such as a cellular phone is used for photographing, a shake is easily occurred. On the other hand, in recent years, in a market of a camera which is mounted on a cellular phone or the like, requirement for a high functional camera is increased and thus a camera which is capable of correcting a shake at the time of photographing is required in the market.

In view of the problem described above, at least an embodiment of the present invention provides a structure of the lens drive device which is capable of driving a lens in the optical axis direction and correcting a shake.

SUMMARY

In order to solve the problem, at least an embodiment of the present invention provides a lens drive device including a first holding body which holds a lens and is movable in an optical axis direction of the lens, a second holding body which holds the first holding body so that the first holding body is movable in the optical axis direction, a fixed body which holds the second holding body so that the second holding body is movable in a direction substantially perpendicular to the optical axis direction, a first drive mechanism for driving the first holding body in the optical axis direction, a second drive mechanism for driving the second holding body in a predetermined first direction substantially perpendicular to the optical axis direction, a third drive mechanism for driving the second holding body in a second direction substantially perpendicular to the optical axis direction and the first direction, a first support member for connecting the first holding body with the second holding body, and a second support member for connecting the second holding body with the fixed body. The first support member and the second support member are formed of elastic material, the first holding body is supported by the second holding body so as to be movable in the optical axis direction through the first support member, and the second holding body is supported by the fixed body so as to be movable in the direction substantially perpendicular to the optical axis direction through the second support member.

In the lens drive device in accordance with at least an embodiment of the present invention, the first holding body which holds a lens is held by the second holding body so as to be movable in the optical axis direction and the second holding body is held by the fixed body so as to be movable in a direction substantially perpendicular to the optical axis direction. Further, the lens drive device in accordance with at least an embodiment of the present invention includes a first drive mechanism for driving the first holding body in the optical axis direction, a second drive mechanism for driving the second holding body in a predetermined first direction substantially perpendicular to the optical axis direction, and a third drive mechanism for driving the second holding body in a second direction substantially perpendicular to the optical axis direction and the first direction. Therefore, the lens is capable of being moved in the optical axis direction together with the first holding body by the first drive mechanism. In other words, in at least an embodiment of the present invention, a focus adjusting operation can be performed by using the first drive mechanism. Further, the lens can be driven in a direction substantially perpendicular to the optical axis direction together with the first holding body and the second holding body by the second drive mechanism and the third drive mechanism. Therefore, in at least an embodiment of the present invention, correction of displacement for a photographing image due to a shake in the direction substantially perpendicular to the optical axis direction is performed by driving the lens in the direction substantially perpendicular to the optical axis direction and, as a result, a shake can be corrected when photographing is performed by a camera on which the lens drive device is mounted.

Further, in at least an embodiment of the present invention, the first holding body is held by the second holding body so as to be movable in the optical axis direction and the second holding body is held by the fixed body so as to be movable in the direction substantially perpendicular to the optical axis direction. Therefore, even when the second drive mechanism and/or the third drive mechanism and the first drive mechanism are simultaneously operated, the first holding body is capable of being relatively moved only in the optical axis direction with respect to the second holding body and the second holding body is capable of being relatively moved only in the direction substantially perpendicular to the optical axis direction with respect to the fixed body. Therefore, according to at least an embodiment of the present invention, inclinations of the first holding body and the second holding body can be restrained when a shake is corrected. In other words, in at least an embodiment of the present invention, inclination of the optical axis of the lens can be restrained when a shake is corrected.

In addition, in at least an embodiment of the present invention, the first holding body is supported by the second holding body so as to be movable in the optical axis direction through the first support member which is formed of elastic material, and the second holding body is supported by the fixed body so as to be movable in the direction substantially perpendicular to the optical axis direction through the second support member which is formed of elastic material. Therefore, the first holding body can be smoothly moved in the optical axis direction and returned to a predetermined reference position by utilizing an elastic force of the first support member. Further, the second holding body can be smoothly moved to the direction substantially perpendicular to the optical axis direction and returned to a predetermined reference position by utilizing an elastic force of the second support member.

In at least an embodiment of the present invention, it is preferable that the first drive mechanism includes a first drive coil and a first drive magnet, the second drive mechanism includes a second drive coil and a second drive magnet, the third drive mechanism includes a third drive coil and a third drive magnet, all of the first drive magnet, the second drive magnet and the third drive magnet are fixed to one of the first holding body, the second holding body and the fixed body. According to this structure, operational failures of the first holding body and the second holding body due to magnetic attraction forces respectively generated between the first drive magnet, the second drive magnet and the third drive magnet can be prevented. In other words, for example, in a case that the first drive magnet is fixed to the second holding body and the second drive magnet and the third drive magnet are fixed to the fixed body, an operation of the second holding body to the direction substantially perpendicular to the optical axis direction with respect to the fixed body may be affected by magnetic attraction forces generated between the second drive magnet and the third drive magnet and the first drive magnet. However, when the first drive magnet, the second drive magnet and the third drive magnet are fixed to the first holding body, the second holding body or the fixed body, this problem is prevented. Therefore, the lens can be appropriately moved in the direction substantially perpendicular to the optical axis direction and in the optical axis direction.

In at least an embodiment of the present invention, it is preferable that the first drive magnet, the second drive magnet and the third drive magnet are fixed to the second holding body, the first drive coil is fixed to the first holding body, and the second drive coil and the third drive coil are fixed to the fixed body. According to this structure, only the first drive coil is disposed on a movable portion. Therefore, in comparison with a case that the first drive coil, the second drive coil and the third drive coil are disposed on a movable portion, a structure for supplying an electric current to the second drive coil and the third drive coil can be simplified. Further, according to this structure, when the second holding body is moved in the direction substantially perpendicular to the optical axis direction, the first drive magnet is also moved in the direction substantially perpendicular to the optical axis direction together with the second holding body and the first drive coil is also moved in the direction substantially perpendicular to the optical axis direction together with the first holding body and the second holding body. Therefore, even when the second holding body is moved in the direction substantially perpendicular to the optical axis direction, variation of relative position of the first drive magnet to the first drive coil can be restrained and thus variation of a drive force of the first drive mechanism can be restrained. As a result, the first holding body can be stably driven in the optical axis direction.

In at least an embodiment of the present invention, it is preferable that the second holding body is provided with a magnet fixing member which is formed of magnetic material and to which the first drive magnet, the second drive magnet and the third drive magnet are fixed. According to this structure, the magnet fixing member provides a function of a common yoke for the first drive magnet, the second drive magnet and the third drive magnet. Therefore, in comparison with a case that a member having a function of a yoke for the first drive magnet, a member having a function of a yoke for the second drive magnet, and a member having a function of a yoke for the third drive magnet are separately disposed from each other, a structure of the lens drive device can be simplified.

In at least an embodiment of the present invention, it is preferable that the magnet fixing member is formed in a substantially tube-like shape, the first drive magnet is disposed on an inner peripheral side of the magnet fixing member, and the second drive magnet and the third drive magnet are disposed on an outer peripheral side of the magnet fixing member. According to this structure, magnetic interference between the magnetic flux generated from the second drive magnet, the magnetic flux generated from the third drive magnet and the magnetic flux generated from the first drive magnet can be prevented.

In at least an embodiment of the present invention, in a case that the first drive magnet, the second drive magnet and the third drive magnet are fixed to the second holding body, the first drive coil is fixed to the first holding body, and the second drive coil and the third drive coil are fixed to the fixed body, it is preferable that the first holding body and the fixed body are formed of nonmagnetic material. According to this structure, operational failures of the first holding body and the second holding body due to magnetic attraction forces generated between the first drive magnet, the second drive magnet and the third drive magnet and the first holding body and the fixed body can be prevented.

In at least an embodiment of the present invention, the lens drive device includes, for example, a plate spring as the first support member which is disposed so that its thickness direction is the optical axis direction and a plurality of wires as the second support member which is disposed so that its longitudinal direction is the optical axis direction. In this case, the first holding body can be smoothly moved in the optical axis direction and returned to a predetermined reference position by utilizing an elastic force of the plate spring which is disposed so that its thickness direction is the optical axis direction. Further, the second holding body can be smoothly moved to the direction substantially perpendicular to the optical axis direction and returned to a predetermined reference position by utilizing elastic forces of a plurality of the wires disposed so that their longitudinal directions are the optical axis direction.

In at least an embodiment of the present invention, it is preferable that the lens drive device includes three or more wires as the second support member which are disposed so that their longitudinal directions are the optical axis direction and an electric current is supplied to the first drive coil through the wire. According to this structure, the second holding body can be smoothly moved to the direction substantially perpendicular to the optical axis direction and returned to a predetermined reference position by utilizing an elastic force of the wire. Further, according to this structure, an electric current can be supplied to the first drive coil which is fixed to the first holding body from the fixed body through the wire. In other words, the wire provides a power supply function to the first drive coil and a support function for the second holding body. Therefore, a structure of the lens drive device can be simplified. Further, according to this structure, the second holding body can be supported in a well-balanced manner by three or more wires.

In at least an embodiment of the present invention, it is preferable that the lens drive device includes two or more plate springs as the first support member which are disposed so that its thickness direction is the optical axis direction and each of both end parts of the first drive coil is separately fixed to one of the plate springs, at least one of the wires is fixed to each of the two plate springs to which each of the both end parts of the first drive coil is fixed, and an electric current is supplied to the first drive coil through the wire and the plate spring. According to this structure, the first holding body can be smoothly moved in the optical axis direction and can be returned to a predetermined reference position by utilizing an elastic force of the plate spring. Further, according to this structure, an electric current can be supplied to the first drive coil which is fixed to the first holding body from the fixed body through the plate spring and the wire. In other words, the plate spring provides a power supply function to the first drive coil and a support function for the first holding body and thus a structure of the lens drive device can be simplified.

In at least an embodiment of the present invention, it is preferable that one end side of the wire is fixed to the second holding body or the plate spring on one end side of the lens drive device in the optical axis direction, and the other end side of the wire is fixed to the fixed body on the other end side of the lens drive device in the optical axis direction. According to this structure, a length of the wire can be set relatively long. Therefore, a spring constant of the wire is easy to be set and a degree of freedom in design of the wire can be enhanced.

In at least an embodiment of the present invention, it is preferable that the first drive mechanism includes a first drive magnet which is formed in a substantially prism shape and a first drive coil which is wound around in a substantially tube shape and is disposed so that an inner peripheral face of the first drive coil faces an outer peripheral face of the first drive magnet through a predetermined gap space, the first drive magnet is provided with two first drive magnet pieces which are formed in a substantially prism shape and are disposed so as to superpose on each other in the optical axis direction, and each of opposing faces of the two first drive magnet pieces in the optical axis direction is magnetized in the same magnetic pole. According to this structure, the first holding body can be driven by utilizing the entire periphery of the first drive magnet and the entire periphery of the first drive coil. Further, a magnetic flux density passing through the first drive coil can be increased between the opposing faces between the two first drive magnet pieces. Therefore, a magnetic circuit for driving the first holding body can be efficiently formed and thus the sizes of the first drive magnet and the first drive coil can be reduced while securing a drive force for driving the lens in the optical axis direction. As a result, a weight of the movable portion of the lens drive device can be reduced and thus responsiveness when a focus adjustment of the lens is performed and responsiveness when a shake is corrected can be enhanced.

In at least an embodiment of the present invention, it is preferable that the first drive magnet includes a magnetic plate which is formed of magnetic material and is disposed between the two first drive magnet pieces in the optical axis direction. According to this structure, the magnetic flux density generated from the first drive magnet can be increased effectively.

In at least an embodiment of the present invention, it is preferable that a shape of the second holding body when viewed in the optical axis direction is a substantially rectangular shape or a substantially square shape and, when viewed in the optical axis direction, the first drive magnet and the first drive coil are disposed at each of four corners of the second holding body. According to this structure, the first drive mechanism can be disposed at four corners, which tend to be dead spaces, of the second holding body. Therefore, the size of the second holding body can be reduced and, as a result, the size of the lens drive device can be reduced. Further, according to this structure, the first holding body can be moved in the optical axis direction in a well-balanced manner by the first drive magnets and the first drive coils which are disposed at four corners of the second holding body. Therefore, when the lens is driven in the optical axis direction by the first drive mechanism, the inclination of the optical axis of the lens can be restrained.

In at least an embodiment of the present invention, for example, the second drive mechanism includes a second drive magnet which is formed in a substantially flat plate shape and a second drive coil which is wound around in a substantially flat plate shape and is oppositely disposed to a surface of the second drive magnet, and the third drive mechanism includes a third drive magnet which is formed in a substantially flat plate shape and a third drive coil which is wound around in a substantially flat plate shape and is oppositely disposed to a surface of the third drive magnet.

In at least an embodiment of the present invention, it is preferable that the second drive coil is wound around in a substantially rectangular shape having two first straight side parts which are disposed to be substantially parallel to the optical axis direction, an opposing face of the second drive magnet to the second drive coil is magnetized so that different magnetic poles respectively face the two first straight side parts, the third drive coil is wound around in a substantially rectangular shape having two second straight side parts which are disposed to be substantially parallel to the optical axis direction, and an opposing face of the third drive magnet to the third drive coil is magnetized so that different magnetic poles respectively face the two second straight side parts. According to this structure, in the second drive mechanism, a drive force in the first direction can be increased by utilizing two first straight side parts provided in one second drive coil, and in the third drive mechanism, a drive force in the second direction can be increased by utilizing two second straight side parts provided in one third drive coil.

In at least an embodiment of the present invention, it is preferable that the second drive mechanism includes "n" pieces ("n" is an integer not less than 2) of the second drive coil which are adjacently disposed so that "2n" pieces of the first straight side part are juxtaposed in the first direction, the opposing face of the second drive magnet to the second drive coil is magnetized in "2n" poles so that an "N"-pole and an "S"-pole are disposed alternately, each of the "2n" pieces of the magnetic pole of the opposing face of the second drive magnet to the second drive coil and each of the "2n" pieces of the first straight side parts juxtaposed in the first direction are faced each other, the third drive mechanism includes "n" pieces of the third drive coil which are adjacently disposed so that "2n" pieces of the second straight side part are juxtaposed in the second direction, the opposing face of the third drive magnet to the third drive coil is magnetized in "2n" poles so that an "N"-pole and an "S"-pole are disposed alternately, and each of the "2n" pieces of the magnetic pole of the opposing face of the third drive magnet to the third drive coil and each of the "2n" pieces of the second straight side parts juxtaposed in the second direction are faced each other. According to this structure, the magnetic flux density can be increased in the opposing face of the second drive magnet to the second drive coil and in the opposing face of the third drive magnet to the third drive coil. Therefore, a drive force in the first direction can be increased effectively by utilizing the "2n" pieces of the first straight side part which are oppositely disposed to the second drive magnet, and a drive force in the second direction can be increased effectively by utilizing the "2n" pieces of the second straight side parts which are oppositely disposed to the third drive magnet.

In at least an embodiment of the present invention, it is preferable that a shape of the lens drive device when viewed in the optical axis direction is a substantially rectangular shape or a substantially square shape, an outer peripheral face of the lens drive device when viewed in the optical axis direction is formed to be substantially parallel to the first direction or the second direction, the second drive magnet and the second drive coil are disposed so that their thickness directions are the second direction and they face each other in the second direction, and the third drive magnet and the third drive coil are disposed so that their thickness directions are the first direction and they face each other in the first direction. According to this structure, the size of the lens drive device can be also reduced in the first direction and the second direction while the size of the lens drive device is reduced in the optical axis direction.

In at least an embodiment of the present invention, a lens drive device includes a first holding body which holds a lens and is movable in an optical axis direction of the lens, a second holding body which holds the first holding body so that the first holding body is movable in the optical axis direction, a fixed body which holds the second holding body so that the second holding body is movable in a direction substantially perpendicular to the optical axis direction, a first drive mechanism for driving the first holding body in the optical axis direction, a second drive mechanism for driving the second holding body in a predetermined first direction substantially perpendicular to the optical axis direction, a third drive mechanism for driving the second holding body in a second direction substantially perpendicular to the optical axis direction and the first direction, a plurality of wires for connecting the second holding body with the fixed body, and a buckling prevention member for preventing buckling of the wire. The wire is formed in a straight line shape, the second holding body is supported by the fixed body so as to be movable in the direction substantially perpendicular to the optical axis direction through the plurality of the wires, and the buckling prevention member is formed of elastic material and is elastically deformed in the optical axis direction by a force smaller than a buckling load of the wire.

In the lens drive device in accordance with at least an embodiment of the present invention, the first holding body which holds the lens is held by the second holding body so as to be movable in the optical axis direction and the second holding body is held by the fixed body so as to be movable in the direction substantially perpendicular to the optical axis direction. Further, the lens drive device in at least an embodiment of the present invention includes a first drive mechanism for driving the first holding body in the optical axis direction, a second drive mechanism for driving the second holding body in a predetermined first direction substantially perpendicular to the optical axis direction, and a third drive mechanism for driving the second holding body in a second direction substantially perpendicular to the optical axis direction and the first direction. Therefore, the lens can be moved in the optical axis direction together with the first holding body by the first drive mechanism. In other words, in at least an embodiment of the present invention, a focus adjusting operation can be performed by using the first drive mechanism. Further, the lens can be driven in a direction substantially perpendicular to the optical axis direction together with the first holding body and the second holding body by the second drive mechanism and the third drive mechanism. Therefore, in at least an embodiment of the present invention, correction of displacement for a photographing image due to a shake in the direction substantially perpendicular to the optical axis direction can be performed by driving the lens in the direction substantially perpendicular to the optical axis direction and, as a result, a shake can be corrected when photographing is performed by a camera on which the lens drive device is mounted.

Further, in at least an embodiment of the present invention, the first holding body is held by the second holding body so as to be movable in the optical axis direction and the second holding body is held by the fixed body so as to be movable in the direction substantially perpendicular to the optical axis direction. Therefore, even when the second drive mechanism and/or the third drive mechanism and the first drive mechanism are simultaneously operated, the first holding body is capable of being relatively moved only in the optical axis direction with respect to the second holding body and the second holding body is capable of being relatively moved only in the direction substantially perpendicular to the optical axis direction with respect to the fixed body. Therefore, according to at least an embodiment of the present invention, inclinations of the first holding body and the second holding body can be restrained when a shake is corrected. In other words, in at least an embodiment of the present invention, inclination of the optical axis of the lens can be restrained when a shake is corrected.

In addition, in at least an embodiment of the present invention, the second holding body and the fixed body are connected with each other by the wires and the second holding body is supported by the fixed body so as to be movable in the direction substantially perpendicular to the optical axis direction by the wires. Therefore, the second holding body can be smoothly moved in the direction substantially perpendicular to the optical axis direction and returned to a predetermined reference position by utilizing an elastic force of the wire.

In at least an embodiment of the present invention, the second holding body is supported by the fixed body so as to be movable in the direction substantially perpendicular to the optical axis direction by the wires and thus the wire is hard to be deformed in the optical axis direction. Therefore, in at least an embodiment of the present invention, inclination of the optical axis of the lens can be restrained when the second holding body is moved in the direction substantially perpendicular to the optical axis direction. On the other hand, since the wire is hard to be deformed in the optical axis direction, when an impact in the optical axis direction is applied to the lens drive device due to dropping or the like, the wire is easy to be buckled. However, the lens drive device in accordance with at least an embodiment of the present invention is provided with a buckling prevention member for preventing buckling of the wire and the buckling prevention member is elastically deformed in the optical axis direction by a force smaller than a buckling load of the wire. Therefore, even when an impact is applied to the lens drive device in the optical axis direction due to dropping or the like, the buckling prevention member is elastically deformed in the optical axis direction and thus buckling of the wire can be prevented. As a result, impact resistance of the lens drive device can be enhanced.

In at least an embodiment of the present invention, it is preferable that the wire is disposed so that its longitudinal direction is substantially parallel to the optical axis direction. According to this structure, the second holding body can be further smoothly moved in the direction substantially perpendicular to the optical axis direction by utilizing an elastic force of the wire. On the other hand, in a case that the wire is disposed so that its longitudinal direction is substantially parallel to the optical axis direction, when an impact in the optical axis direction is applied to the lens drive device, the wire is easy to be buckled. However, in at least an embodiment of the present invention, the buckling prevention member is elastically deformed in the optical axis direction and thereby buckling of the wire can be prevented.

In at least an embodiment of the present invention, it is preferable that the lens drive device includes an abutting member which is abutted with the second holding body when the buckling prevention member is elastically deformed in the optical axis direction to prevent buckling of the wire and the abutting member is formed in the fixed body or fixed to the fixed body. According to this structure, buckling of the wire is surely prevented by the buckling prevention member and the abutting member. Further, according to this structure, in comparison with a case that a member corresponding to the abutting member is formed or fixed to the second holding body, the weight of a movable portion of the lens drive device is reduced. Therefore, responsiveness of the lens when a shake is corrected can be enhanced.

In at least an embodiment of the present invention, for example, the buckling prevention member connects one end side of the wire with the second holding body. Alternatively, for example, the buckling prevention member connects the other end side of the wire with the fixed body.

In at least an embodiment of the present invention, it is preferable that the lens drive device includes a plate spring for connecting the first holding body with the second holding body and a part of the plate spring is the buckling prevention member. According to this structure, a member for connecting the first holding body with the second holding body and the buckling prevention member are integrated with each other. Therefore, a structure of the lens drive device can be simplified. Further, handling of the buckling prevention member is easy when the lens drive device is to be assembled.

In at least an embodiment of the present invention, it is preferable that the plate spring is provided with a first fixing part which is fixed to the first holding body, a second fixing part which is fixed to the second holding body, an arm part which connects the first fixing part with the second fixing part, and a wire fixing part which is formed so as to be protruded from the second fixing part and to which one end side of the wire is fixed, and the wire fixing part is the buckling prevention member. According to this structure, even when a member for connecting the first holding body with the second holding body and the buckling prevention member are integrated with each other, both functions which are a support function for the first holding body by the arm part and a buckling preventing function for the wire by the wire fixing part can be separated from each other through the second fixing part which is fixed to the second holding body. Therefore, both functions which are the support function for the first holding body by the arm part and the buckling preventing function for the wire by the wire fixing part can be operated appropriately.

In at least an embodiment of the present invention, it is preferable that lens drive device includes two or more plate springs, the first drive mechanism includes a first drive magnet, which is fixed to the second holding body or the fixed body, and a first drive coil which is fixed to the first holding body, each of both end parts of the first drive coil is separately fixed to and electrically connected with one of the two or more plate springs, and at least one of the wires is fixed to and electrically connected with each of the two plate springs to which each of the both end parts of the first drive coil is fixed. According to this structure, an electric current can be supplied from the fixed body to the first drive coil which is fixed to the first holding body through the plate spring and the wire. In other words, an electric current can be supplied from the fixed body to the first drive coil through the buckling prevention member and thus the buckling prevention member provides the power supply function to the first drive coil and the buckling preventing function for the wire. Therefore, the structure of the lens drive device can be simplified.

In order to solve the above-mentioned problem, at least an embodiment of the present invention provides a lens drive device including a first holding body which holds a lens and is movable in an optical axis direction of the lens, a second holding body which holds the first holding body so that the first holding body is movable in the optical axis direction, a fixed body which holds the second holding body so that the second holding body is movable in a direction substantially perpendicular to the optical axis direction, a first drive mechanism for driving the first holding body in the optical axis direction, a second drive mechanism for driving the second holding body in a predetermined first direction substantially perpendicular to the optical axis direction, a third drive mechanism for driving the second holding body in a second direction substantially perpendicular to the optical axis direction and the first direction, and a plurality of wires for connecting the second holding body with the fixed body. The wire is provided with a straight line part, which is formed in a straight line shape and is disposed so that the second holding body is supported by the fixed body so as to be movable in a direction substantially perpendicular to the optical axis direction, and a buckling prevention part which is formed so as to be bent from at least one end of the straight line part and is elastically deformed in the optical axis direction by a force smaller than a buckling load of the straight line part to prevent buckling of the straight line part.

In the lens drive device in accordance with at least an embodiment of the present invention, the first holding body which holds the lens is held by the second holding body so as to be movable in the optical axis direction and the second holding body is held by the fixed body so as to be movable in the direction substantially perpendicular to the optical axis direction. Further, the lens drive device in at least an embodiment of the present invention includes a first drive mechanism for driving the first holding body in the optical axis direction, a second drive mechanism for driving the second holding body in a predetermined first direction substantially perpendicular to the optical axis direction, and a third drive mechanism for driving the second holding body in a second direction substantially perpendicular to the optical axis direction and the first direction. Therefore, in at least an embodiment of the present invention, a focus adjusting operation can be performed by moving the lens in the optical axis direction as described above and, in addition, a shake can be corrected when photographing is performed by using a camera on which the lens drive device is mounted.

Further, in at least an embodiment of the present invention, the first holding body is held by the second holding body so as to be movable in the optical axis direction and the second holding body is held by the fixed body so as to be movable in the direction substantially perpendicular to the optical axis direction. Therefore, according to at least an embodiment of the present invention, inclinations of the first holding body and the second holding body can be restrained when a shake is corrected and the inclination of the optical axis of the lens can be restrained when a shake is corrected.

In addition, in at least an embodiment of the present invention, the second holding body and the fixed body are connected with each other by the wires and the second holding body is supported by the fixed body so as to be movable in the direction substantially perpendicular to the optical axis direction through the straight line parts of the wires formed in a straight line shape. Therefore, the second holding body can be smoothly moved in the direction substantially perpendicular to the optical axis direction and returned to a predetermined reference position by utilizing an elastic force of the straight line part.

In at least an embodiment of the present invention, the second holding body is supported by the fixed body so as to be movable in the direction substantially perpendicular to the optical axis direction through the straight line parts and thus the straight line parts are hard to be deformed in the optical axis direction. Therefore, in at least an embodiment of the present invention, inclination of the optical axis of the lens can be restrained when the second holding body is moved in the direction substantially perpendicular to the optical axis direction. On the other hand, since the straight line part is hard to be deformed in the optical axis direction, when an impact is applied to the lens drive device in the optical axis direction due to dropping or the like, the straight line part is easy to be buckled. However, in at least an embodiment of the present invention, the wire is provided with a buckling prevention part which is formed so as to be bent from at least one end of the straight line part and is elastically deformed in the optical axis direction by a force smaller than a buckling load of the straight line part to prevent buckling of the straight line part. Therefore, in a case that an impact such as dropping or the like is applied to the lens drive device, the buckling prevention part is elastically deformed in the optical axis direction and thus buckling of the straight line part can be prevented. As a result, impact resistance of the lens drive device can be enhanced.

In at least an embodiment of the present invention, it is preferable that the straight line part is disposed so that its longitudinal direction is substantially parallel to the optical axis direction. According to this structure, the second holding body can be further smoothly moved in the direction substantially perpendicular to the optical axis direction by utilizing an elastic force of the straight line part. On the other hand, in a case that the straight line part is disposed so that its longitudinal direction is substantially parallel to the optical axis direction, when an impact is applied to the lens drive device in the optical axis direction, the straight line part is easy to be buckled. However, in at least an embodiment of the present invention, the buckling prevention member is elastically deformed in the optical axis direction and thereby buckling of the straight line part can be prevented.

As described above, in the lens drive device in accordance with at least an embodiment of the present invention, the lens is capable of being driven in the optical axis direction and a shake can be corrected. Further, in the lens drive device in accordance with at least an embodiment of the present invention, inclination of the optical axis of the lens can be restrained. In addition, in at least an embodiment of the present invention, the first holding body and the second holding body can be moved smoothly and returned to predetermined reference positions. Further, in at least an embodiment of the present invention, impact resistance of the lens drive device can be enhanced.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which:

FIG. 1 is a perspective view showing a lens drive device in accordance with an embodiment of the present invention.

FIG. 3 is a plan view for explaining a structure of the lens drive device shown in FIG. 1.

FIG. 5 is a perspective view showing a state that a first holding body and a second holding body shown in FIG. 2 are supported by a base plate.

FIG. 14(A) is a view showing a state when an impact is not applied to the lens drive device in an optical axis direction and FIG. 14(B) is a view showing a state when an impact is applied to the lens drive device in the optical axis direction.

DETAILED DESCRIPTION OF EMBODIMENTS

Embodiments of the present invention will be described below with reference to the accompanying drawings.
(Schematic Structure of Lens Drive Device)

Figure 2:
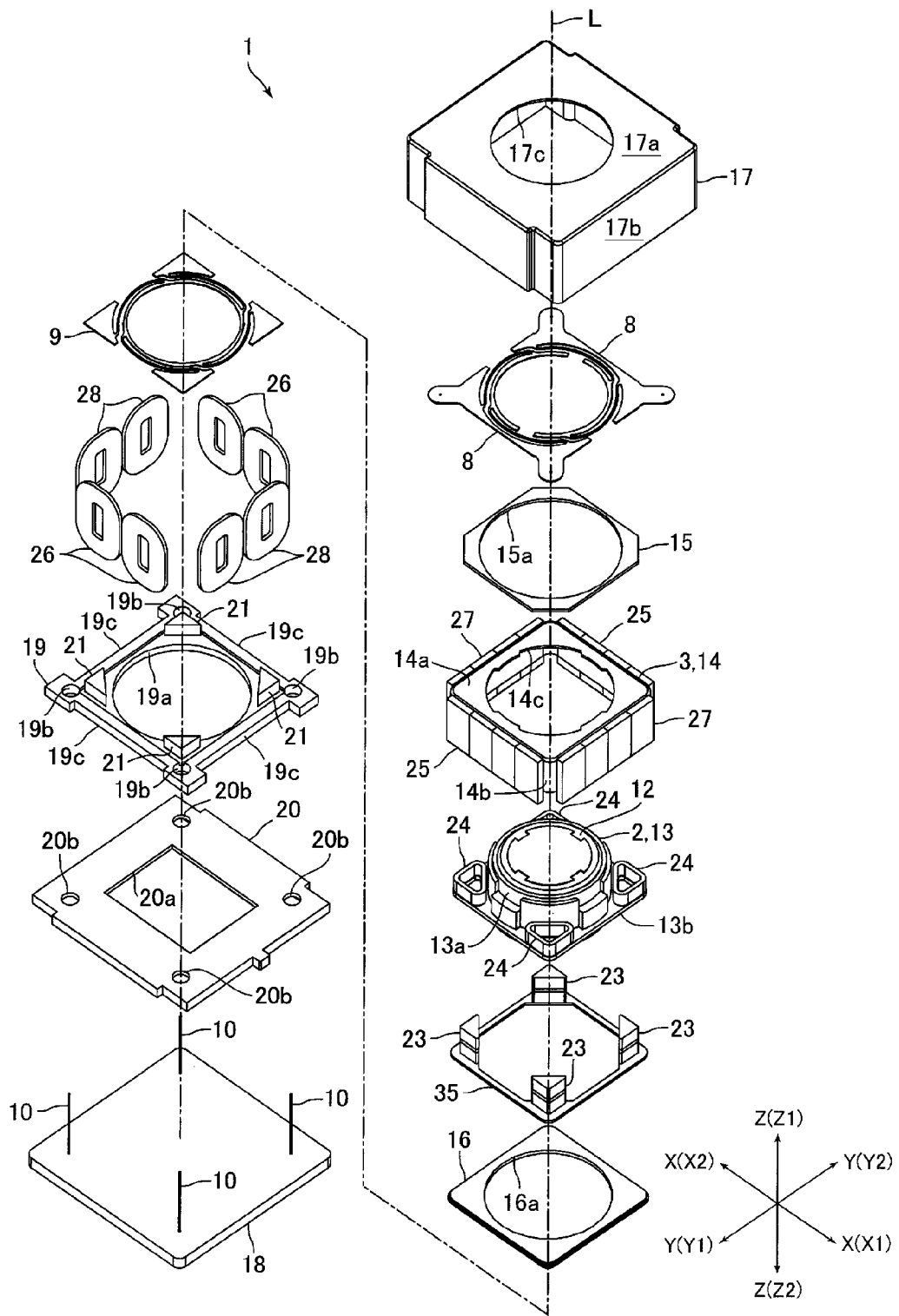
FIG. 2 is an exploded perspective view showing the lens drive device in FIG. 1.
Figure 4:
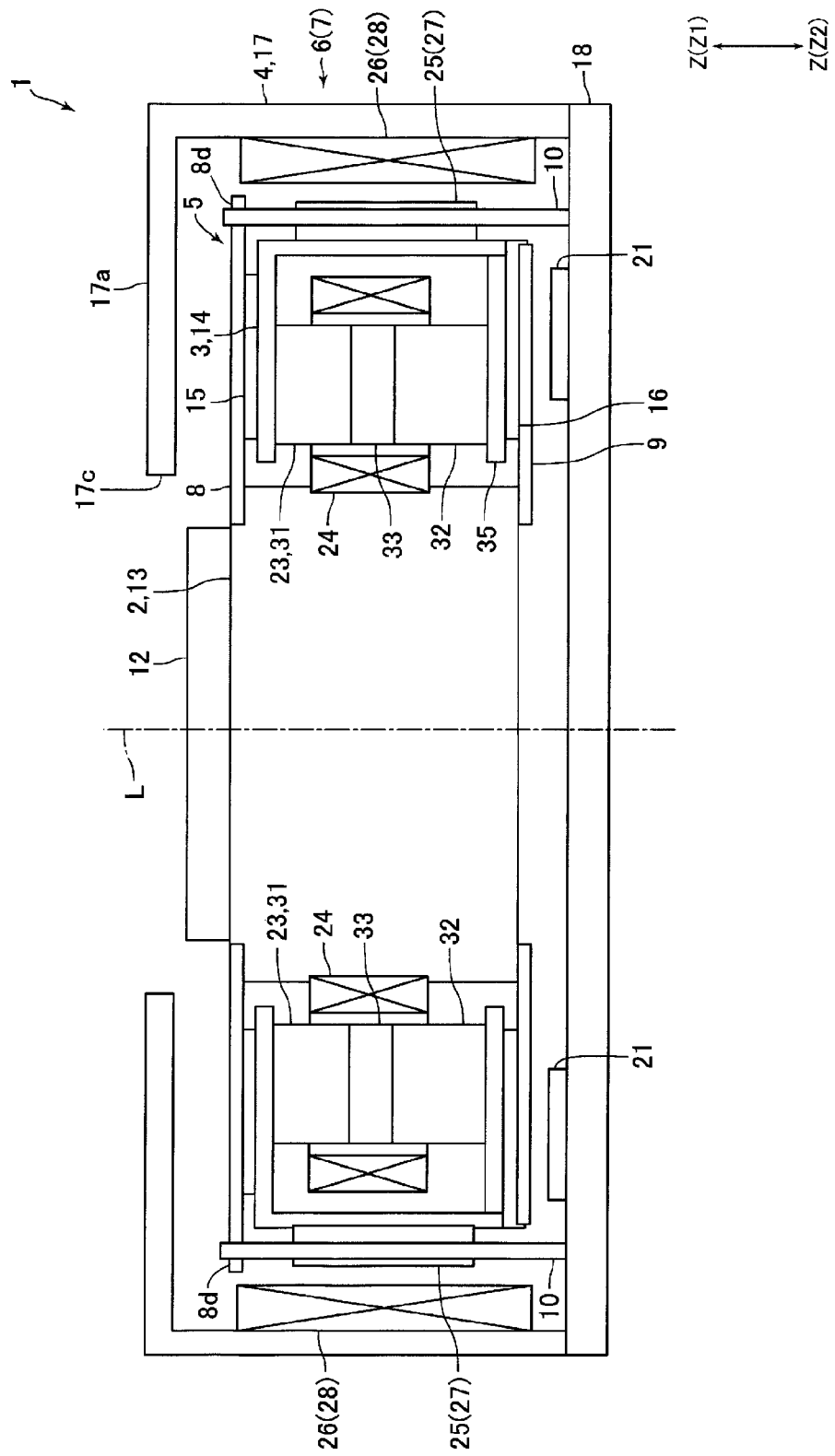
FIG. 4 is a schematic side view for explaining a schematic structure of the lens drive device shown in FIG. 1.
Figure 6:
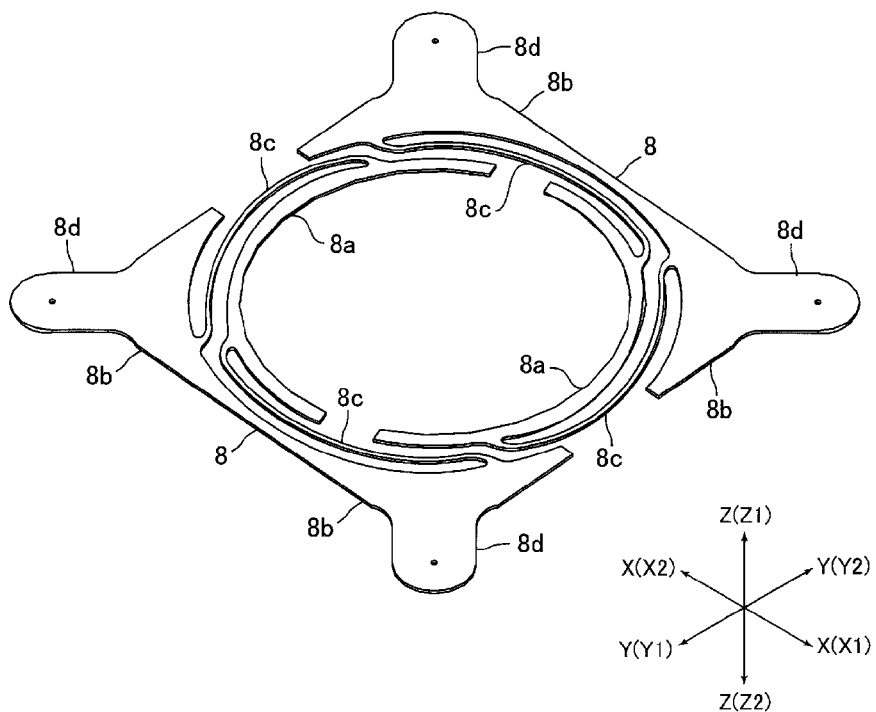
FIG. 6 is a perspective view showing a plate spring in FIG. 2.
Figure 7:
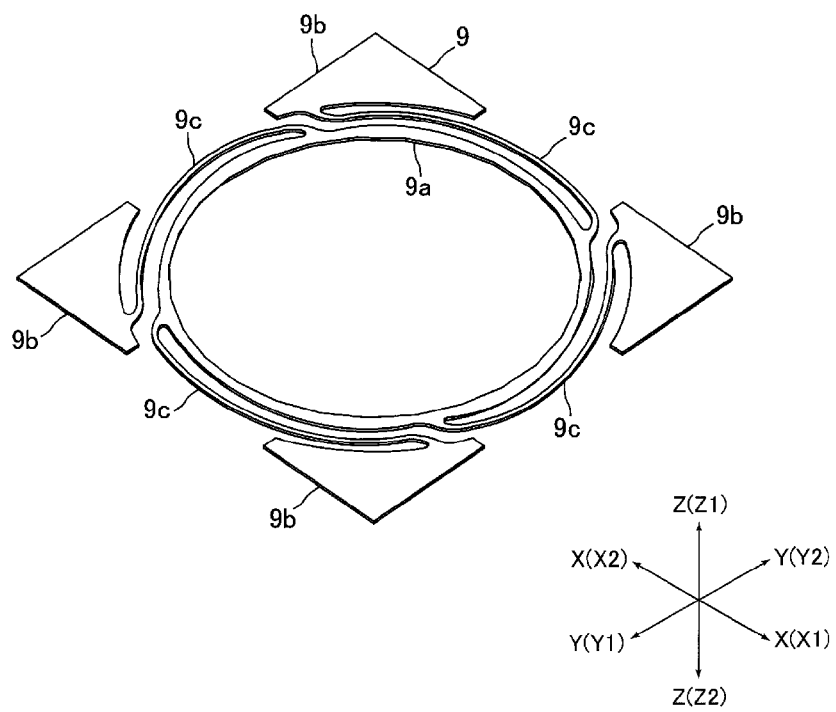
FIG. 7 is a perspective view showing a plate spring in FIG. 2.

FIG. 1 is a perspective view showing a lens drive device 1 in accordance with an embodiment of the present invention. FIG. 2 is an exploded perspective view showing the lens drive device 1 in FIG. 1. FIG. 3 is a plan view for explaining a structure of the lens drive device 1 shown in FIG. 1. FIG. 4 is a schematic side view for explaining a schematic structure of the lens drive device 1 shown in FIG. 1. FIG. 5 is a perspective view showing a state that a first holding body 2 and a second holding body 3 shown in FIG. 2 are supported by a base plate 18. FIG. 6 is a perspective view showing a plate spring 8 in FIG. 2. FIG. 7 is a perspective view showing a plate spring 9 in FIG. 2. In FIG. 3, a plan view of the lens drive device 1 is shown in which a plate spring 8, a lens holder 12, a spacer 15, a cover member 17 and a bottom part 14a of a magnet fixing member 14 shown in FIG. 2 are detached. Further, in FIG. 4, a coil fixing member 19, a protection member 20 and the like are not shown.

In the following description, as shown in FIG. 1 and the like, three directions perpendicular to each other are set to be an "X" direction, a "Y" direction and a "Z" direction. Further, an "X1" direction side in FIG. 1 and the like is referred to as a "right" side, an "X2" direction side is referred to as a "left" side, a "Y1" direction side is referred to as a "front" side, a "Y2" direction side is referred to as a "rear" side, a "Z1" direction side is as an "upper" side, and a "Z2" direction side is as a "lower" side. Further, a plane which is formed by the "Y" direction and the "Z" direction is referred to as a "YZ" plane and a plane which is formed by the "Z" direction and the "X" direction is referred to as a "ZX" plane.

A lens drive device 1 in this embodiment is mounted on a relatively small camera which is used in a cellular phone, a drive recorder, a monitor camera system or the like. The lens drive device 1 is, as shown in FIG. 1, formed in a substantially rectangular prism shape as a whole. Specifically, the lens drive device 1 is formed in a substantially rectangular shape or a substantially square shape when viewed in a direction of an optical axis "L" (optical axis direction) of a lens for photography. In this embodiment, the lens drive device 1 is formed in a substantially square shape when viewed in the optical axis direction. Further, in this embodiment, four side faces of the lens drive device 1 are substantially parallel to the "YZ" plane or the "ZX" plane.

The lens drive device 1 includes, as shown in FIGS. 1 through 4, a first holding body 2 which holds a lens for photography and is movable in the optical axis direction, a second holding body 3 which holds the first holding body 2 so that the first holding body 2 is movable in the optical axis direction, a fixed body 4 which holds the second holding body 3 so that the second holding body 3 is movable in a direction substantially perpendicular to the optical axis direction, a first drive mechanism 5 for driving the first holding body 2 in the optical axis direction, a second drive mechanism 6 for driving the second holding body 3 in a right and left direction, and a third drive mechanism 7 for driving the second holding body 3 in a front and rear direction.

Further, the lens drive device 1 includes plate springs 8 and 9 as a first support member for connecting the first holding body 2 with the second holding body 3 and a plurality of wires 10 as a second support member for connecting the second holding body 3 with the fixed body 4. In other words, in this embodiment, the first holding body 2 is movably supported in the optical axis direction by the second holding body 3 through the plate springs 8 and 9 and the second holding body 3 is movably supported in the direction substantially perpendicular to the optical axis direction by the fixed body 4 through a plurality of the wires 10.

In this embodiment, the "Z" direction (upper and lower direction) is coincided with the optical axis direction. Further, in this embodiment, the "X" direction (right and left direction) is a first direction which is substantially perpendicular to the optical axis direction and the "Y" direction (front and rear direction) is a second direction which is substantially perpendicular to the optical axis direction and the first direction. Further, in this embodiment, an imaging element is disposed on a lower portion ("Z2" direction side) of the lens drive device 1 and an object to be photographed which is disposed on an upper side ("Z1" direction side) is photographed. In other words, in this embodiment, an upper side is an object to be photographed side (object side) and a lower side is an opposite-to-object side (imaging element side, image side).

The first holding body 2 includes a sleeve 13 which holds a lens holder 12 to which a lens for photography is fixed. The second holding body 3 includes a magnet fixing member 14 to which a first drive magnet 23, a second drive magnet 25 and a third drive magnet 27 described below are fixed, a spacer 15 which is fixed to the magnet fixing member 14 and to which a part of the plate spring 8 is fixed, and a spacer 16 which is fixed to the magnet fixing member 14 and to which a part of the plate spring 9 is fixed. The fixed body 4 includes a cover member 17 which structures front and rear and right and left side faces of the lens drive device 1, a base plate 18 structuring an under face of the lens drive device 1, a coil fixing member 19 to which a second drive coil 26 and a third drive coil 28 described below are fixed, and a protection member 20 which protects the imaging element.

The lens holder 12 is, for example, formed of nonmagnetic resin material. Further, the lens holder 12 is formed in a substantially cylindrical tube shape. A lens for photography is fixed to an inner peripheral side of the lens holder 12.

The sleeve 13 is, for example, formed of nonmagnetic resin material. Further, the sleeve 13 is provided with a tube part 13a which is formed in a roughly cylindrical tube shape and a flange part 13b which is formed to extend from a lower end side of the tube part 13a to an outer side in a radial direction of the tube part 13a.

The tube part 13a holds the lens holder 12 on its inner peripheral side. In other words, an outer peripheral face of the lens holder 12 is fixed to an inner peripheral face of the tube part 13a. The flange part 13b is formed in a substantially square shape when viewed in the upper and lower direction and the shape of the first holding body 2 when viewed in the upper and lower direction is a substantially square shape. Further, an outer peripheral end of the flange part 13b when viewed in the upper and lower direction is substantially parallel to the right and left direction or the front and rear direction. The first drive coil 24 described below is fixed to four corners of an upper face of the flange part 13b. Further, an arrangement hole 13c to which the first drive magnet 23 described below is disposed is formed at four corners of the flange part 13b so as to penetrate through in the upper and lower direction (see FIG. 3).

The magnet fixing member 14 is formed of magnetic material. For example, the magnet fixing member 14 is formed of metal material having a magnetic property. Further, the magnet fixing member 14 is formed in a substantially rectangular bottomed tube shape having a bottom part 14a and a tube part 14b. Specifically, the magnet fixing member 14 is formed in a substantially rectangular bottomed tube shape whose shape when viewed in the upper and lower direction is a substantially square shape and the shape of the second holding body 3 when viewed in the upper and lower direction is a substantially square shape. A center of the bottom part 14a which is disposed on the upper side is formed with a through hole 14c penetrating through in the upper and lower direction and an upper end side of the first holding body 2 is disposed in the through hole 14c. Further, four side faces structuring the tube part 14b are substantially parallel to the "YZ" plane or the "ZX" plane. The magnet fixing member 14 is disposed so as to surround outer peripheral sides of the first holding body 2 and the first drive mechanism 5 and is disposed on an inner side of the cover member 17.

The spacers 15 and 16 are, for example, formed of resin material having an insulation property. Further, the spacers 15 and 16 are formed in a substantially square-shaped thin plate. Outer peripheral ends of the spacers 15 and 16 when viewed in the upper and lower direction are substantially parallel to the right and left direction or the front and rear direction. Centers of the spacers 15 and 16 are formed with through holes 15a and 16a penetrating through in the upper and lower direction. An upper end side of the first holding body 2 is disposed in the through hole 15a and a lower end side of the first holding body 2 is disposed in the through hole 16a.

The spacer 15 is fixed to an upper face of the bottom part 14a of the magnet fixing member 14. Further, a second fixing part 8b described below which structures the plate spring 8 is fixed to an upper face of the spacer 15. The spacer 16 is fixed to a lower end of the tube part 14b of the magnet fixing member 14. Further, a second fixing part 9b described below which structures the plate spring 9 is fixed to an under face of the spacer 16.

The cover member 17 is formed of nonmagnetic material. For example, the cover member 17 is formed of nonmagnetic metal material such as a stainless-steel plate. Further, the cover member 17 is formed in a substantially rectangular bottomed tube shape having a bottom part 17a and a tube part 17b. Specifically, the cover member 17 is formed in a substantially rectangular bottomed tube shape whose shape when viewed in the upper and lower direction is a substantially square shape. A center of the bottom part 17a disposed on the upper side is formed with a through hole 17c penetrating through in the upper and lower direction. Further, four side faces structuring the tube part 17b are substantially parallel to the "YZ" plane or the "ZX" plane. The cover member 17 is disposed so as to surround outer peripheral sides of the first holding body 2, the second holding body 3, the first drive mechanism 5, the second drive mechanism 6 and the third drive mechanism 7.

The base plate 18 is a circuit board which is formed in a substantially square-shaped plate. The base plate 18 is mainly formed of nonmagnetic material. For example, the base plate 18 is mainly formed of epoxy glass (glass epoxy) or the like. An outer peripheral end of the base plate 18 when viewed in the upper and lower direction is substantially parallel to the right and left direction or the front and rear direction. An imaging element not shown is mounted on a center of the base plate 18. Further, the base plate 18 is mounted with a sensor such as a gyroscope (angular velocity sensor) for detecting variation of inclination of the lens drive device 1 and a drive circuit and a control circuit for driving and controlling the first drive mechanism 5, the second drive mechanism 6 and the third drive mechanism 7, and the like. In addition, the base plate 18 is formed with circuit patterns for power supply for supplying an electric current to the first drive coil 24, the second drive coil 26 and the third drive coil 28 described below.

The coil fixing member 19 is, for example, formed of nonmagnetic resin material. Further, the coil fixing member 19 is formed in a roughly square-shaped plate and an outer peripheral end of the coil fixing member 19 when viewed in the upper and lower direction is substantially parallel to the right and left direction or the front and rear direction. A center of the coil fixing member 19 is formed with a through hole 19a penetrating through in the upper and lower direction. Further, an insertion hole 19b into which a wire 10 is inserted is formed at four corners of the coil fixing member 19 so as to penetrate through in the upper and lower direction. Further, recessed parts 19c for fixing lower end sides of the second drive coils 26 and the third drive coils 28 described below are formed at outer peripheral end of the coil fixing member 19 so as to be recessed toward inner sides in the right and left direction and toward inner sides in the front and rear direction.

An upper face of the coil fixing member 19 is fixed with an abutting member 21 which is structured to be abutted with an under face of the second holding body 3 when the wire fixing part 8d described below structuring the plate spring 8 is deformed to the lower direction (see FIG. 2). In this embodiment, the abutting member 21 is fixed at each of the vicinities of four corners of the coil fixing member 19. In other words, in this embodiment, the abutting member 21 is fixed at four positions in the vicinities of the four corners of the coil fixing member 19.

The abutting member 21 is, for example, formed of nonmagnetic resin material. Further, the abutting member 21 is, for example, formed in a substantially triangular prism shape and is fixed to the coil fixing member 19 so as to protrude upward from an upper face of the coil fixing member 19. In accordance with an embodiment of the present invention, the abutting member 21 may be integrally formed with the coil fixing member 19. In other words, the coil fixing part may be formed on the upper face in the vicinities of the four corners of the coil fixing member 19 so as to protrude to the upper side.

The protection member 20 is, for example, formed of nonmagnetic resin material. Further, the protection member 20 is formed in a substantially square plate shape and an outer peripheral end of the protection member 20 when viewed in the upper and lower direction is substantially parallel to the right and left direction or the front and rear direction. A center of the protection member 20 is formed with a through hole 20a penetrating through in the upper and lower direction and the imaging element mounted on the base plate 18 is disposed in the through hole 20a. Further, an insertion hole 20b through which the wire 10 is passed is formed at four corners of the protection member 20 so as to penetrate through in the upper and lower direction. The protection member 20 is fixed on a lower end side of the cover member 17. Further, the coil fixing member 19 is fixed on the upper face of the protection member 20 and the base plate 18 is fixed to an under face of the protection member 20.

In this embodiment, when viewed in the upper and lower direction, a mechanical gravity center of the first holding body 2 is substantially coincided with the optical axis "L", a mechanical gravity center of the second holding body 3 is substantially coincided with the optical axis "L", and a mechanical gravity center of the fixed body 4 is substantially coincided with the optical axis "L". In other words, in this embodiment, a mechanical gravity center of the lens drive device 1 is substantially coincided with the optical axis "L" when viewed in the upper and lower direction.

The plate springs 8 and 9 are formed of elastic material. Further, the plate springs 8 and 9 are formed of electrically conductive material. For example, the plate springs 8 and 9 are formed of metal material having elasticity and electro-conductivity. The plate springs 8 and 9 are disposed so that their thickness directions are substantially parallel to the upper and lower direction. In this embodiment, two plate springs 8 are disposed on the upper end side of the sleeve 13 and one plate spring 9 is disposed on the lower end side of the sleeve 13.

The plate spring 8 is, as shown in FIG. 6, provided with a first fixing part 8a which is fixed to an upper end of the sleeve 13, two second fixing parts 8b which are fixed to an upper face of the spacer 15, two arm parts 8c which connect the first fixing part 8a with the second fixing part 8b, and two wire fixing parts 8d to which an upper end of the wire 10 is fixed. Further, an external shape of the plate springs 8 are formed in a substantially square shape when two plate springs 8 are attached to the sleeve 13 and the like. Further, an outer peripheral end of the substantially square shape formed by two plate springs 8 when viewed in the upper and lower direction is substantially parallel to the right and left direction or the front and rear direction.

The first fixing part 8a is formed in a substantially semi-circular arc shape. The second fixing part 8b is formed in a roughly triangular shape and is disposed at four corners of a substantially square shape formed by two plate springs 8. In other words, the first fixing part 8a is disposed on an inner side in a radial direction with respect to the second fixing part 8b. The arm part 8c acts as a spring part which supports the first holding body 2. The arm part 8c is formed in a substantially ¼ circular arc shape so as to obtain a predetermined spring force. The wire fixing part 8d is formed so as to protrude toward an outer side in the radial direction from the second fixing part 8b. Specifically, the wire fixing part 8d is formed to protrude from the second fixing part 8b in a direction inclined by substantially 45° with respect to the right and left direction and the front and rear direction. Specifically, the wire fixing part 8d is formed so as to protrude from the second fixing part 8b in a direction inclined by substantially 45° with respect to the right and left direction and the front and rear direction. Further, the wire fixing part 8d is formed so that its shape when viewed in the upper and lower direction is a substantially semi-elliptic shape. In other words, when viewed in the upper and lower direction, the wire fixing part 8d is protruded from the second fixing part 8b with a substantially constant width toward the direction inclined by a substantially 45° with respect to the right and left direction and the front and rear direction and an end part of the wire fixing part 8d is formed in a semicircular shape. The wire fixing part 8d is formed with an insertion hole into which an upper end of the wire 10 is inserted so as to penetrate through in the upper and lower direction.

As described above, the second fixing part 8b is fixed to an upper face of the spacer 15 which structures the second holding body 3. Further, the upper end of the wire 10 is fixed to the wire fixing part 8d which is formed so as to protrude from the second fixing part 8b toward the outer side in the radial direction. In other words, the wire fixing part 8d is fixed to the second holding body 3 through the second fixing part 8b and the upper end of the wire 10 is fixed to the wire fixing part 8d. As described above, in this embodiment, the second holding body 3 and the upper end of the wire 10 are connected with each other through the wire fixing part 8d.

The plate spring 9 is, as shown in FIG. 7, provided with a first fixing part 9a which is fixed to a lower end of the sleeve 13, four pieces of second fixing part 9b which are fixed to an under face of the spacer 16, and four arm parts 9c which connect the first fixing part 9a with the second fixing part 9b. Further, the plate spring 9 is formed so that its external shape is a substantially square shape and an outer peripheral end of the plate spring 9 when viewed in the upper and lower direction is substantially parallel to the right and left direction or the front and rear direction.

The first fixing part 9a is formed in a substantially circular shape. The second fixing part 9b is formed in a substantially triangular shape and is disposed at four corners of the plate spring 9. The arm part 9c acts as a spring part which supports the first holding body 2. The arm part 9c is formed in a substantially ¼ circular arc shape so as to obtain a predetermined spring force.

The wire 10 is formed of elastic material. Further, the wire 10 is formed of electrically conductive material. For example, the wire 10 is formed of metal material having elasticity and electro-conductivity. Further, the wire 10 is formed in a long and thin and substantially cylindrical straight shape. The wire 10 is disposed so that its longitudinal direction is substantially parallel to the upper and lower direction. In accordance with an embodiment of the present invention, the wire 10 may be formed in a long and thin and substantially polygonal pillar shape such as a substantially rectangular pillar shape or may be formed in a long and thin and substantially elliptic pillar shape.

As shown in FIG. 5, a lower end of the wire 10 is fixed to the base plate 18. The upper end of the wire 10 is fixed and electrically connected with the wire fixing part 8d of the plate spring 8. In other words, the upper ends of two wires 10 are fixed to and electrically connected with the one piece of the plate spring 8. Further, the lower end of one of the two wires 10 which are fixed to the one piece of the plate spring 8 is electrically connected with a circuit pattern for power supply which is formed on the base plate 18.

In this embodiment, as shown in FIG. 5, the wire 10 is disposed at each of the vicinities of the four corners of the second holding body 3 when viewed in the upper and lower direction, and the second holding body 3 is supported by the fixed body 4 through four wires 10. Further, in this embodiment, the four wires 10 are disposed at 90° rotationally symmetrical positions with a mechanical gravity center of the second holding body 3 as a substantial center when viewed in the optical axis direction. In other words, in this embodiment, the four wires 10 are disposed at 90° rotationally symmetrical positions with the optical axis "L" as a center when viewed in the optical axis direction.

An end part on the winding start side and an end part of the winding end side of the first drive coil 24 described below are fixed and electrically connected with each of the two plate springs 8. Further, one of the two wires 10 fixed to the plate spring 8 and the plate spring 8 perform a power supply function for supplying an electric current to the first drive coil 24 from the base plate 18.

The first drive mechanism 5 includes first drive magnets 23 formed in a substantially triangular prism shape and first drive coils 24 which are formed so as to be wound around in a roughly triangular tube shape. The second drive mechanism 6 includes a second drive magnet 25 formed in a substantially rectangular flat plate shape and second drive coils 26 which are formed so as to be wound around in a substantially rectangular flat plate shape. The third drive mechanism 7 includes a third drive magnet 27 formed in a substantially rectangular flat plate shape and third drive coils 28 which are formed so as to be wound around in a substantially rectangular flat plate shape. Next, detail structures of the first drive mechanism 5, the second drive mechanism 6 and the third drive mechanism 7 will be described below.

(Structures of First Drive Mechanism, Second Drive Mechanism and Third Drive Mechanism)

Figure 8:
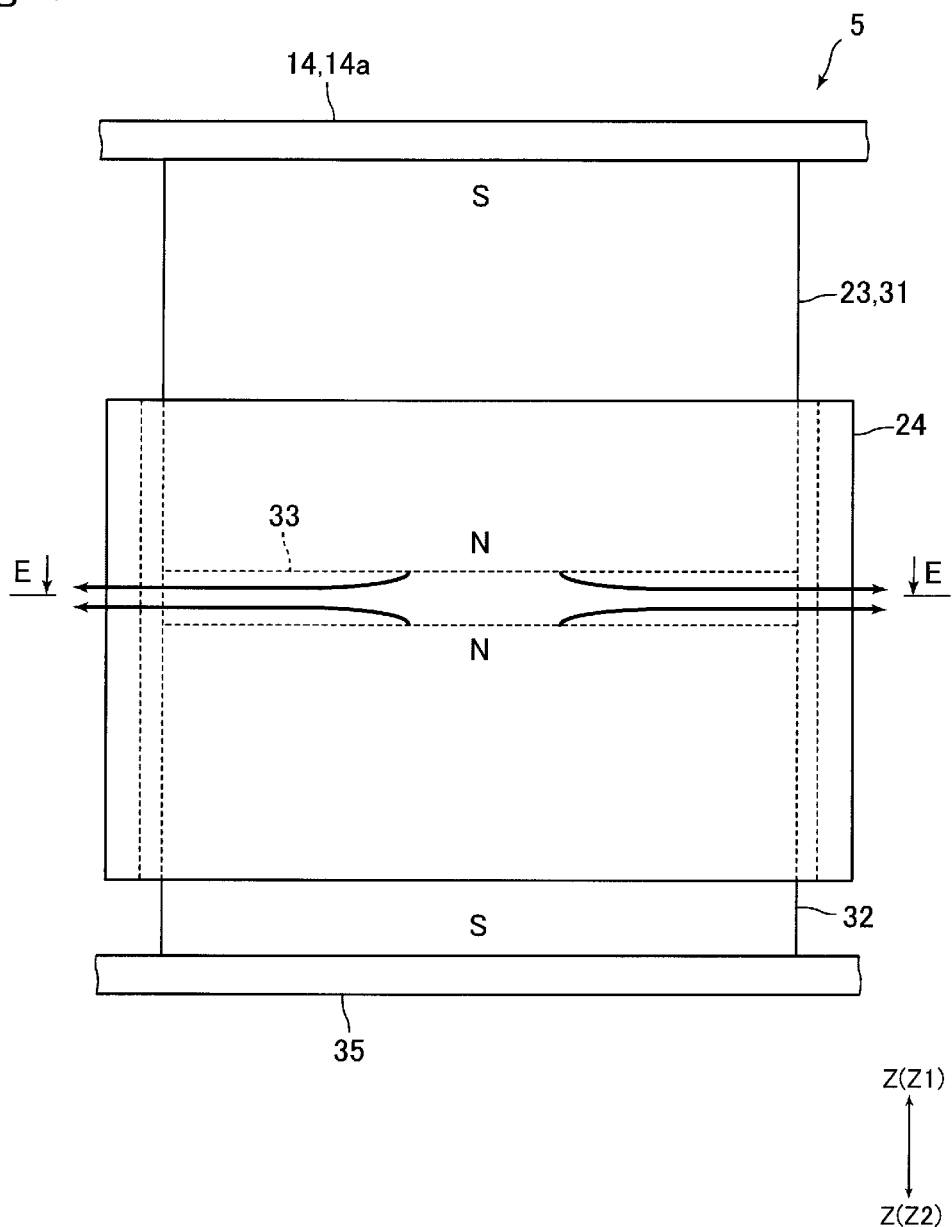
FIG. 8 is a side view showing a first drive magnet and a first drive coil shown in FIG. 2.
Figure 9:
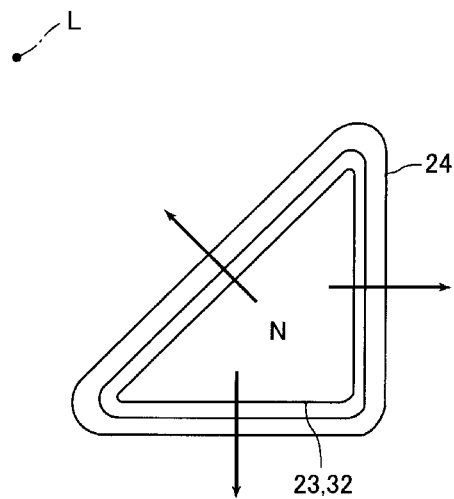
FIG. 9 is a view showing a first drive magnet piece and the first drive coil which are viewed in the "E-E" direction in FIG. 8.
Figure 10:
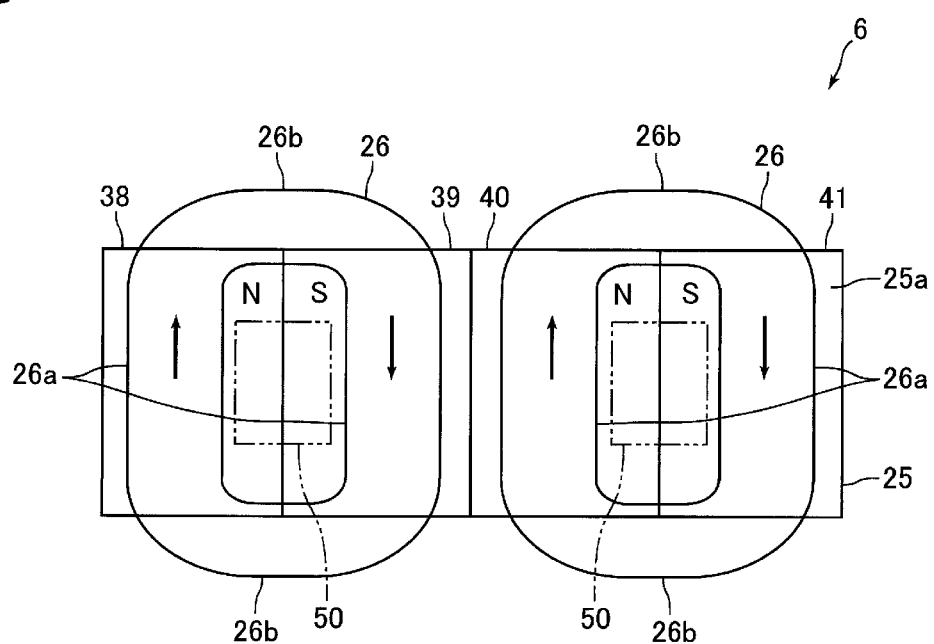
FIG. 10 is an explanatory view showing a facing relationship of a second drive magnet to second drive coils which is viewed in the "F-F" direction in FIG. 3.

FIG. 8 is a side view showing the first drive magnet 23 and the first drive coil 24 shown in FIG. 2. FIG. 9 is a view showing a first drive magnet piece 32 and the first drive coil 24 which are viewed in the "E-E" direction in FIG. 8. FIG. 10 is an explanatory view showing a facing relationship of the second drive magnet 25 to the second drive coils 26 which is viewed in the "F-F" direction in FIG. 3.

As described above, the first drive mechanism 5 includes the first drive magnet 23 and the first drive coil 24.

The first drive magnet 23 is, as described above, formed in a substantially triangular prism shape and is disposed on an inner peripheral side of the tube part 14b of the magnet fixing member 14 so that its longitudinal direction is substantially parallel to the upper and lower direction. The first drive coil 24 is, as described above, formed in a roughly triangular tube shape and is disposed so that its inner peripheral face is oppositely disposed to an outer peripheral face of the first drive magnet 23 through a predetermined gap space.

In this embodiment, as shown in FIG. 3, the first drive magnet 23 and the first drive coil 24 are disposed at each of the four corners of the first holding body 2 and the second holding body 3 when viewed in the upper and lower direction. Therefore, a center of a drive force of the first drive mechanism 5 when viewed in the upper and lower direction is substantially coincided with mechanical gravity centers of the first holding body 2 and the second holding body 3 (in other words, a mechanical gravity center of the lens drive device 1). In other words, when viewed in the upper and lower direction, the center of the drive force of the first drive mechanism 5 is substantially coincided with the optical axis "L".

The first drive magnet 23 includes, as shown in FIG. 8, two first drive magnet pieces 31 and 32 which are formed in a substantially triangular prism shape and are disposed so as to superpose on each other in the upper and lower direction and a magnetic plate 33 having a substantially triangular shape which is disposed between the first drive magnet pieces 31 and 32. In this embodiment, the first drive magnet piece 31 is disposed on an upper side and the first drive magnet piece 32 is disposed on a lower side. Further, a lower end face of the first drive magnet piece 31 and an upper end face of the magnetic plate 33 are fixed to each other and an upper end face of the first drive magnet piece 32 and a lower end face of the magnetic plate 33 are fixed to each other.

The first drive magnet pieces 31 and 32 are formed so that their shapes when viewed in the upper and lower direction are a substantially rectangular equilateral triangle. The first drive magnet pieces 31 and 32 are disposed so that, when viewed in the upper and lower direction, two sides except the oblique side are substantially parallel to an inner peripheral face of the tube part 14b of the magnet fixing member 14. In other words, when viewed in the upper and lower direction, the first drive magnet pieces 31 and 32 are disposed so that oblique sides of the first drive magnet pieces 31 and 32 disposed on diagonal lines of the second holding body 3 are faced each other. The magnetic plate 33 is formed of magnetic material. The magnetic plate 33 is formed in a flat plate shape so that its shape when viewed in the upper and lower direction is a substantially rectangular equilateral triangle which is similar to the first drive magnet pieces 31 and 32.

An upper end face of the first drive magnet piece 31 is fixed to an under face of the bottom part 14a of the magnet fixing member 14 and the upper end face of the first drive magnet piece 31 is abutted with the under face of the bottom part 14a. A lower end face of the first drive magnet piece 32 is fixed to a magnetic member 35 which is formed of magnetic material in a flat plate shape and the lower end face of the first drive magnet piece 32 is abutted with an upper face of the magnetic member 35. The magnetic member 35 is formed in a substantially square frame shape so that four first drive magnet pieces 32 are fixed (see FIG. 2). The under face of the magnetic member 35 is fixed to an upper face of the spacer 16. Further, an outer peripheral end of the magnetic member 35 when viewed in the upper and lower direction is substantially paralleled to the right and left direction or the front and rear direction and the outer peripheral end of the magnetic member 35 is abutted with the inner peripheral face of the tube part 14b of the magnet fixing member 14. In this embodiment, the magnet fixing member 14 and the magnetic member 35 function as a yoke for the first drive magnet 23.

The first drive coil 24 is, as shown in FIGS. 3 and 9, wound around so that its shape when viewed in the upper and lower direction is a roughly rectangular equilateral triangle. The first drive coil 24 is fixed at four corners of the upper face of the flange part 13b of the sleeve 13. Specifically, the first drive coil 24 is fixed to the upper face of the flange part 13b so that an inner peripheral face of the first drive coil 24 and the outer peripheral face of the first drive magnet 23 are substantially parallel to each other through a predetermined gap space, and the first drive coil 24 is disposed on the inner side of the tube part 14b of the magnet fixing member 14. A predetermined gap space is formed between the first drive coil 24 and the tube part 14b and thus the first drive coil 24 is movable in the upper and lower direction together with the sleeve 13 with respect to the second holding body 3.

In this embodiment, the first drive magnet 23 and the first drive coil 24 are formed and disposed so that a lower end of the first drive coil 24 is not moved to an upper side with respect to the upper end of the first drive magnet piece 32 and, in addition, so that an upper end of the first drive coil 24 is not moved to a lower side with respect to the lower end of the first drive magnet piece 31. Further, in this embodiment, four first drive coils 24 are formed by using one conducting wire wound around successively. Further, an end part on a winding start side of the first drive coil 24 is fixed and electrically connected with the first fixing part 8a of one of the two plate springs 8 and an end part on a winding end side of the first drive coil 24 is fixed and electrically connected with the first fixing part 8a of the other of the two plate springs 8.

As shown in FIG. 8, two first drive magnet pieces 31 and 32 which structure the first drive magnet 23 are disposed so that the same magnetic poles ("S"-pole and "S"-pole, or "N"-pole and "N"-pole) are faced each other in the upper and lower direction. In other words, the opposing faces of the first drive magnet pieces 31 and 32 are magnetized in the same magnetic pole. For example, both of the opposing faces of the first drive magnet pieces 31 and 32 are magnetized in an "N"-pole. Therefore, as shown by the arrows in FIGS. 8 and 9, a magnetic flux passing through the entire periphery of the first drive coil 24 is generated between the first drive magnet pieces 31 and 32. In other words, the first drive magnet 23 is magnetized so that a magnetic flux passing through the first drive coil 24 is generated at a facing position with the first drive coil 24.

The second drive mechanism 6 includes, as described above, the second drive magnet 25 and the second drive coils 26.

The second drive magnet 25 is, as described above, formed in a substantially rectangular flat plate shape and is disposed on an outer peripheral side of the tube part 14b of the magnet fixing member 14 so that its thickness direction is substantially parallel to the front and rear direction. Further, the second drive magnet 25 is disposed on the outer peripheral side of the tube part 14b so that its longitudinal direction is substantially parallel to the right and left direction and its short side direction is substantially parallel to the upper and lower direction. The second drive coil 26 is, as described above, formed in a roughly rectangular flat plate shape and is disposed on an outer side of the second drive magnet 25 in the front and rear direction so that its thickness direction is substantially parallel to the front and rear direction and the second drive coil 26 is oppositely disposed to the second drive magnet 25 through a predetermined gap space in the front and rear direction.

In this embodiment, one piece of the second drive magnet 25 and two pieces of the second drive coil 26 are oppositely disposed to each other on both sides of the magnet fixing member 14 in the front and rear direction. Further, in this embodiment, when viewed in the upper and lower direction, two sets of the second drive magnet 25 and the second drive coil 26 comprised of one piece of the second drive magnet 25 and two pieces of the second drive coil 26 facing each other are substantially line-symmetrically disposed with respect to a line parallel to the right and left direction which passes the mechanical gravity center of the second holding body 3. Further, in this embodiment, a center of the drive forces of the second drive mechanisms 6 when viewed in the upper and lower direction is substantially coincided with the mechanical gravity center of the second holding body 3. In other words, when viewed in the upper and lower direction, the center of the drive forces of the second drive mechanisms 6 is substantially coincided with the optical axis "L". In accordance with an embodiment of the present invention, it may be structured that, when viewed in the upper and lower direction, two sets of the second drive magnet 25 and the second drive coil 26 comprised of one second drive magnet 25 and two second drive coils 26 facing each other are substantially point-symmetrically disposed with respect to the mechanical gravity center of the second holding body 3.

The second drive magnet 25 is fixed to each of a front side face and a rear side face of the tube part 14b of the magnet fixing member 14 and inner side faces of the second drive magnets 25 in the front and rear direction are abutted with a front side face or a rear side face of the tube part 14b. In this embodiment, the magnet fixing member 14 functions as a yoke for the second drive magnet 25.

Further, the second drive magnet 25 is, as shown in FIG. 10, structured of four second drive magnet pieces 38 through 41. The second drive magnet pieces 38 through 41 are formed in a substantially rectangular thin plate shape. Further, the second drive magnet pieces 38 through 41 are formed in the same shape. The second drive magnet pieces 38 through 41 are fixed in an abutted state in this order in the right and left direction.

The second drive magnet pieces 38 through 41 are magnetized so that an "N"-pole and an "S"-pole are alternately disposed on an opposing face 25a of the second drive magnet 25 to the second drive coil 26. For example, an opposing face of the second drive magnet piece 38 to the second drive coil 26 is magnetized in an "N"-pole, an opposing face of the second drive magnet piece 39 to the second drive coil 26 is magnetized in an "S"-pole, an opposing face of the second drive magnet piece 40 to the second drive coil 26 is magnetized in an "N"-pole, and an opposing face of the second drive magnet piece 41 to the second drive coil 26 is magnetized in an "S"-pole. In other words, the opposing face 25a of the second drive magnet 25 to the second drive coil 26 are magnetized in four poles so that an "N"-pole and an "S"-pole are alternately disposed.

The second drive coil 26 is wound around in a roughly rectangular shape as described above and is an air-core coil which is structured of two long side parts 26a substantially parallel to each other and two short side parts 26b shorter than the long side part 26a and substantially parallel to each other (see FIG. 10). A lower end of the second drive coil 26 is fixed to the coil fixing member 19. Specifically, the second drive coil 26 is fixed to the coil fixing member 19 so that the long side part 26a is substantially parallel to the upper and lower direction. The long side part 26a in this embodiment is a first straight side part which is disposed so as to be substantially parallel to the optical axis direction (upper and lower direction).

Further, two second drive coils 26 are adjacently disposed to each other in the right and left direction so as to face the second drive magnet 25 which is fixed to the front side face of the magnet fixing member 14, and two second drive coils 26 are adjacently disposed to each other in the right and left direction so as to face the second drive magnet 25 which is fixed to the rear side face of the magnet fixing member 14. Winding directions of the two second drive coils 26 which are adjacently disposed to each other in the right and left direction are the same as each other. For example, two second drive coils 26 which are adjacently disposed to each other in the right and left direction are wound around in a clockwise direction in FIG. 10. Further, in this embodiment, for example, two second drive coils 26 disposed on the front face side of the magnet fixing member 14 and two second drive coils 26 disposed on the rear face side of the magnet fixing member 14 are formed by using one conducting wire which is wound around successively.

In this embodiment, as shown in FIG. 10, the second drive magnet 25 and the second drive coils 26 are formed and disposed so that each of four magnetic poles of the opposing face 25a of the second drive magnet 25 faces each of four long side parts 26a juxtaposed in the right and left direction. In other words, in this embodiment, the opposing face 25a of the second drive magnet 25 is magnetized so that different magnetic poles are faced two respective long side parts 26a structuring one second drive coil 26. In this embodiment, the second drive magnet 25 and the second drive coils 26 are formed and disposed so that, even when the second holding body 3 is moved in the right and left direction, each of four magnetic poles of the opposing face 25a of the second drive magnet 25 always faces each of four long side parts 26a juxtaposed in the right and left direction.

The third drive mechanism 7 includes, as described above, the third drive magnet 27 and the third drive coils 28.

The third drive magnet 27 is, as described above, formed in a substantially rectangular flat plate shape and is disposed on an outer peripheral side of the tube part 14b of the magnet fixing member 14 so that its thickness direction is substantially parallel to the right and left direction. Further, the third drive magnet 27 is disposed on the outer peripheral side of the tube part 14b so that its longitudinal direction is substantially parallel to the front and rear direction and its short side direction is substantially parallel to the upper and lower direction. The third drive coil 28 is, as described above, formed in a roughly rectangular flat plate shape and is disposed on an outer side of the third drive magnet 27 in the right and left direction so that its thickness direction is substantially parallel to the right and left direction and the third drive coil 26 is oppositely disposed to the third drive magnet 27 through a predetermined gap space in the right and left direction.

In this embodiment, one piece of the third drive magnet 27 and two pieces of the third drive coil 28 are oppositely disposed to each other on both sides of the magnet fixing member 14 in the right and left direction. Further, in this embodiment, when viewed in the upper and lower direction, two sets of the third drive magnet 27 and the third drive coil 28 comprised of one piece of the third drive magnet 27 and two pieces of the second drive coil 28 facing each other are substantially line-symmetrically disposed with respect to a line parallel to the front and rear direction which passes through the mechanical gravity center of the second holding body 3. Further, in this embodiment, a center of drive forces of the third drive mechanisms 7 when viewed in the upper and lower direction is substantially coincided with the mechanical gravity center of the second holding body 3. In other words, when viewed in the upper and lower direction, the center of the drive forces of the third drive mechanisms 7 is substantially coincided with the optical axis "L". In accordance with an embodiment of the present invention, it may be structured that, when viewed in the upper and lower direction, two sets of the third drive magnet 27 and the third drive coil 28 comprised of one third drive magnet 27 and two third drive coils 28 facing each other are substantially point-symmetrically disposed with respect to the mechanical gravity center of the second holding body 3.

The third drive magnet 27 is fixed to each of a right side face and a left side face of the tube part 14b of the magnet fixing member 14 and inner side faces of the third drive magnets 27 in the right and left direction are abutted with a right side face or a left side face of the tube part 14b. In this embodiment, the magnet fixing member 14 functions as a yoke for the third drive magnet 27.

Further, the third drive magnet 27 is, similarly to the second drive magnet 25, structured of four second drive magnet pieces 38 through 41. In the third drive magnet 27, the second drive magnet pieces 38 through 41 are fixed in an abutted state in this order in the front and rear direction. An opposing face 27a of the third drive magnet 27 to the third drive coil 28 is, similarly to the opposing face 25a of the second drive magnet 25, magnetized in four poles so that an "N"-pole and an "S"-pole are alternately disposed.

The third drive coil 28 is an air-core coil whose shape is similar to the second drive coil 26 and is structured of two long side parts 28a substantially parallel to each other and two short side parts shorter than the long side part 28a and substantially parallel to each other. A lower end of the third drive coil 28 is fixed to the coil fixing member 19. Specifically, the third drive coil 28 is fixed to the coil fixing member 19 so that the long side parts 28a are substantially parallel to the upper and lower direction. The long side part 28a in this embodiment is a second straight side part which is disposed so as to be substantially parallel to the optical axis direction (upper and lower direction).

Further, two third drive coils 28 are adjacently disposed to each other in the front and rear direction so as to face the third drive magnet 27 which is fixed to the right side face of the magnet fixing member 14, and two third drive coils 28 are adjacently disposed to each other in the front and rear direction so as to face the third drive magnet 27 which is fixed to the left side face of the magnet fixing member 14. Winding directions of the two third drive coils 28 which are adjacently disposed to each other in the front and rear direction are the same as each other. Further, in this embodiment, for example, two third drive coils 28 disposed on the right face side of the magnet fixing member 14 and two third drive coils 28 disposed on the left face side of the magnet fixing member 14 are formed by using one conducting wire which is wound around successively.

In this embodiment, similarly to the second drive magnet 25 and the second drive coils 26, the third drive magnet 27 and the third drive coils 28 are formed and disposed so that each of four magnetic poles of the opposing face 27a of the third drive magnet 27 faces each of four long side parts 28a juxtaposed in the front and rear direction. In other words, in this embodiment, the opposing face 27a of the third drive magnet 27 is magnetized so that different magnetic poles are faced two respective long side parts 28a structuring one piece of the third drive coil 28. In this embodiment, the third drive magnet 27 and the third drive coils 28 are formed and disposed so that, even when the second holding body 3 is moved in the front and rear direction, each of four magnetic poles of the opposing face 27a of the third drive magnet 27 always faces each of four long side parts 28a juxtaposed in the front and rear direction.

(Operations of Wire Fixing Part and Abutting Member)

Figure 13:
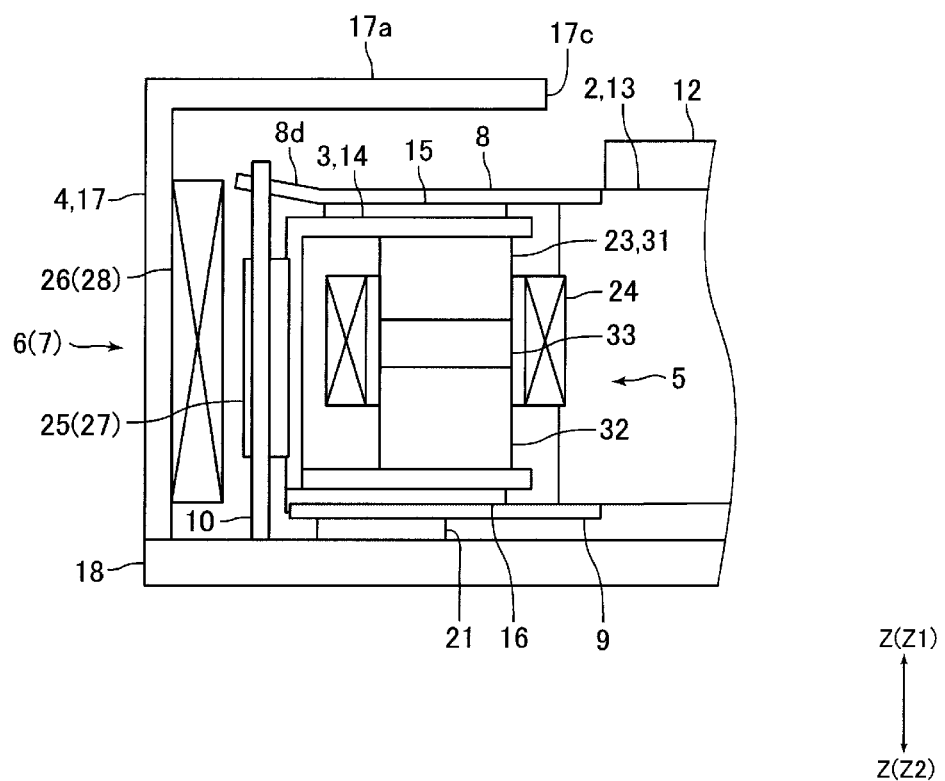
FIG. 13 is a view for explaining operations of a wire fixing part of a plate spring and an abutting member shown in FIG. 2.

FIG. 13 is a view for explaining operations of the wire fixing part 8d of the plate spring 8 and the abutting member 21 shown in FIG. 2.

As described above, the upper end of the wire 10 is fixed to the wire fixing part 8d of the plate spring 8 and the lower end of the wire 10 is fixed to the base plate 18, and the wire 10 is disposed so that its longitudinal direction (axial direction) is substantially parallel to the upper and lower direction. Therefore, the wire 10 is hardly deformed in the upper and lower direction. Further, a diameter of the wire 10 in this embodiment is very small. Therefore, when a force is applied to the wire 10 in the axial direction, the wire 10 is easily buckled.

Accordingly, in this embodiment, buckling of the wire 10 is prevented by the wire fixing part 8d and the abutting member 21.

Specifically, a width and a thickness of the wire fixing part 8d are set so that, when a force in a lower direction is applied to a movable portion such as the second holding body 3 or the like, the wire fixing part 8d is elastically deformed in the lower direction by a force smaller than a buckling load of the wire 10 with a boundary part between the second fixing part 8b and the wire fixing part 8d as a supporting point. Further, the abutting member 21 is disposed at a position abutting with the under face of the second holding body 3 before the wire 10 is buckled when the wire fixing part 8d is deformed to the lower direction. For example, the abutting member 21 is disposed at a position abutting with the under face of the second fixing part 9b of the plate spring 9 which is fixed to the under face of the spacer 16 structuring the second holding body 3.

Therefore, when a force in a lower direction is applied to a movable portion of the second holding body 3 or the like, the wire fixing part 8d is elastically deformed in the lower direction before the wire 10 is buckled as shown in FIG. 13. Further, when the wire fixing part 8d is elastically deformed in the lower direction, the upper face of the abutting member 21 is abutted with the under face of the second holding body 3 before the wire 10 is buckled and thus movement of the second holding body 3 in the lower direction is restricted. In this embodiment, buckling of the wire 10 is prevented by the operations of the wire fixing part 8d and the abutting member 21. In this embodiment, the wire fixing part 8d is a buckling prevention member for preventing buckling of the wire 10. In other words, in this embodiment, a part of the plate spring 8 is a buckling prevention member for preventing buckling of the wire 10.

(Schematic Operation of Lens Drive Device)

In the lens drive device 1 structured as described above, when photographing is to be performed with a camera on which the lens drive device 1 is mounted, an electric current is supplied to the first drive coil 24 to move the first holding body 2 in the optical axis direction and focus adjustment of the lens is executed. Further, when a shake of the camera is detected by the gyroscope mounted on the base plate 18, an electric current is supplied to the second drive coil 26 and/or the third drive coil 28 based on a detection result of the sensor and the second holding body 3 is moved together with the first holding body 2 in the front and rear direction and/or the right and left direction to correct the shake.

For example, in this embodiment, supply amounts of electric currents to the second drive coil 26 and the third drive coil 28 are controlled by open control in which electric currents required to correct a shake by moving the second holding body 3 in the right and left direction and/or the front and rear direction are supplied to the second drive coil 26 and the third drive coil 28 based on a shake amount of the camera detected by the gyroscope.

In accordance with an embodiment of the present invention, when the lens drive device 1 includes a position sensor such as a Hall element for detecting a position of the second holding body 3 in the front and rear direction and the right and left direction, feedback control (closed control) may be executed in which, while monitoring a detection result of the position sensor, electric currents required to correct a shake are supplied to the second drive coil 26 and the third drive coil 28. In this case, for example, as shown by the two-dot chain line in FIG. 10, a Hall element 50 for detecting a position of the second holding body 3 in the right and left direction is disposed at one or both of the inner peripheral sides of two second drive coils 26 and the position of the second holding body 3 in the right and left direction is detected by the Hall element 50 and the second drive magnet 25. Similarly, a Hall element for detecting a position of the second holding body 3 in the front and rear direction is disposed at one or both of the inner peripheral sides of two third drive coils 28 and the position of the second holding body 3 in the front and rear direction is detected by the Hall element 50 and the third drive magnet 27.

(Principal Effects in this Embodiment)

As described above, in this embodiment, the first holding body 2 which holds a lens for photography is held by the second holding body 3 so as to be movable in the optical axis direction and the second holding body 3 is held by the fixed body 4 so as to be movable in the front and rear direction and the right and left direction (front, rear, right and left directions). Therefore, the lens can be moved in the optical axis direction together with the first holding body 2 by the first drive mechanism 5. In other words, in this embodiment, an operation of focus adjustment is executed by using the first drive mechanism 5. Further, the lens can be driven together with the first holding body 2 and the second holding body 3 in the front, rear, right and left directions by the second drive mechanism 6 and the third drive mechanism 7. Therefore, in this embodiment, the lens is driven in the front, rear, right and left directions and thereby displacement of a photographing image due to a shake in a direction substantially perpendicular to the optical axis direction can be corrected and, as a result, a shake can be corrected when photographing is performed with a camera on which the lens drive device 1 is mounted.

In this embodiment, the first holding body 2 is movably supported in the optical axis direction by the second holding body 3 through the plate springs 8 and 9 and the second holding body 3 is movably supported in the front, rear, right and left directions by the fixed body 4 through the wires 10. Therefore, the first holding body 2 can be smoothly moved in the optical axis direction and, in addition, the first holding body 2 can be returned to a predetermined reference position by utilizing elastic forces of the plate springs 8 and 9. Further, the second holding body 3 can be smoothly moved in the front, rear, right and left directions and, in addition, the second holding body 3 can be returned to a predetermined reference position by utilizing the elastic forces of the wires 10. Especially, in this embodiment, the wire 10 is disposed so that its longitudinal direction is substantially parallel to the upper and lower direction and thus the second holding body 3 can be moved further smoothly in the front, rear, right and left directions by utilizing the elastic force of the wire 10.

Further, in this embodiment, the first holding body 2 is held by the second holding body 3 so as to be movable in the optical axis direction and the second holding body 3 is held by the fixed body 4 so as to be movable in the front, rear, right and left directions. Therefore, even when the second drive mechanism 6 and/or the third drive mechanism 7 and the first drive mechanism 5 are acted simultaneously, the first holding body 2 is relatively moved only in the optical axis direction with respect to the second holding body 3 and the second holding body 3 is relatively moved only in the front, rear, right and left directions with respect to the fixed body 4. Accordingly, in this embodiment, when a shake is corrected, inclinations of the first holding body 2 and the second holding body 3 with respect to the upper and lower direction can be restrained. In other words, in this embodiment, when a shake is corrected, an inclination of the optical axis "L" of the lens can be restrained. Especially, in this embodiment, the wire 10 is disposed at respective positions in the vicinities of the four corners of the second holding body 3 when viewed in the upper and lower direction. Therefore, the second holding body 3 can be supported by four wires 10 in a well balanced manner and thus, when a shake is corrected, inclinations of the first holding body 2 and the second holding body 3 with respect to the upper and lower direction can be restrained. Further, in this embodiment, the wire 10 is disposed so that its longitudinal direction is substantially parallel to the upper and lower direction and thus the wire 10 is hardly deformed in the upper and lower direction. Therefore, when the second holding body 3 is moved in the front, rear, right and left directions, the inclination of the optical axis "L" of the lens can be restrained effectively. In other words, in this embodiment, when a shake is corrected, inclination of the optical axis "L" of the lens can be restrained effectively.

In this embodiment, the first drive magnet 23, the second drive magnet 25 and the third drive magnet 27 are fixed to the magnet fixing member 14. Therefore, operational failures of the first holding body 2 and the second holding body 3 due to magnetic attraction forces generated between the first drive magnet 23, the second drive magnet 25 and the third drive magnet 27 can be prevented. In other words, for example, in a case that the first drive magnet 23 is fixed to the magnet fixing member 14 and the second drive magnet 25 and the third drive magnet 27 are fixed to the cover member 17, operations of the second holding body 3 in the front, rear, right and left directions to the fixed body 4 may be affected due to magnetic attraction forces generated between the second drive magnet 25 and the third drive magnet 27 and the first drive magnet 23. Alternatively, for example, in a case that the first drive magnet 23 is fixed to the sleeve 13 and the second drive magnet 25 and the third drive magnet 27 are fixed to the magnet fixing member 14, an operation of the first holding body 2 in the optical axis direction to the second holding body 3 may be affected due to magnetic attraction forces generated between the second drive magnet 25 and the third drive magnet 27 and the first drive magnet 23. However, in this embodiment, the operational failure is prevented.

Further, in this embodiment, the lens holder 12, the sleeve 13, the cover member 17, the base plate 18, the coil fixing member 19 and the protection member 20 are formed of nonmagnetic material. In other words, the first holding body 2 and the fixed body 4 are formed of nonmagnetic material. Therefore, operational failures of the first holding body 2 and the second holding body 3 due to magnetic attraction forces generated between the first drive magnet 23, the second drive magnet 25 and the third drive magnet 27, which are fixed to the second holding body 3, and the first holding body 2 and the fixed body 4 are prevented. Accordingly, in this embodiment, the lens can be moved appropriately in the optical axis direction and in the front, rear, right and left directions.

Further, in this embodiment, the first drive magnet 23, the second drive magnet 25 and the third drive magnet 27 are fixed to the magnet fixing member 14 which is formed of magnetic material and thus the common magnet fixing member 14 provides a function of yokes for the first drive magnet 23, the second drive magnet 25 and the third drive magnet 27. Therefore, in comparison with a case that a member having a function of a yoke for the first drive magnet 23, a member having a function of a yoke for the second drive magnet 25, and a member having a function of a yoke for the third drive magnet 27 are separately disposed from each other, a structure of the lens drive device 1 can be simplified.

In this embodiment, the first drive coils 24 are fixed to the sleeve 13 and the second drive coils 26 and the third drive coils 28 are fixed to the coil fixing member 19. In other words, in this embodiment, only the first drive coils 24 are disposed on a movable portion. Therefore, in this embodiment, in comparison with a case that the first drive coils 24, the second drive coils 26 and the third drive coils 28 are disposed on a movable portion, a structure for supplying electric currents to the second drive coils 26 and the third drive coils 28 can be simplified.

In this embodiment, the first drive magnets 23 are fixed to the magnet fixing member 14 and the first drive coils 24 are fixed to the sleeve 13 and thus, when the second holding body 3 is moved in the front, rear, right and left directions, the first drive magnets 23 are also moved in the front, rear, right and left directions together with the second holding body 3 and, in addition, the first drive coils 24 are also moved in the front, rear, right and left directions together with the first holding body 2 and the second holding body 3. Therefore, even when the second holding body 3 is moved in the front, rear, right and left directions, variation of relative position between the first drive magnets 23 and the first drive coils 24 can be restrained and thus variation of a drive force of the first drive mechanism 5 can be restrained. As a result, in this embodiment, the first holding body 2 can be stably driven in the optical axis direction.

In this embodiment, the first drive magnets 23 are disposed on the inner peripheral side of the magnet fixing member 14 and the second drive magnets 25 and the third drive magnets 27 are disposed on the outer peripheral side of the magnet fixing member 14. Therefore, in this embodiment, a magnetic interference of the magnetic flux generated from the second drive magnet 25 and the magnetic flux generated from the third drive magnet 27 with the magnetic flux generated from the first drive magnet 23 can be prevented.

In this embodiment, both end parts of the first drive coil 24 are fixed to the respective first fixing parts 8a of the two plate springs 8 and the upper end of the wire 10 is fixed to the wire fixing part 8d of the plate spring 8. Further, one of the two wires 10 fixed to the plate spring 8 and the plate spring 8 serve as a power supply function for supplying an electric current to the first drive coils 24 from the base plate 18. Therefore, the plate spring 8 provides a power supply function to the first drive coils 24 and a support function for the first holding body 2 and, in addition, the wire 10 provides a power supply function to the first drive coils 24 and a support function for the second holding body 3. In other words, a structure for supporting the first holding body 2 and a structure for supplying an electric current to the first drive coils 24 are not required to provide separately, and a structure for supporting the second holding body 3 and a structure for supplying an electric current to the first drive coils 24 are not required to provide separately. Therefore, in this embodiment, a structure of the lens drive device 1 can be simplified.

In this embodiment, the upper end of the wire 10 is fixed to the plate spring 8 which is disposed on the upper end of the lens drive device 1 and the lower end of the wire 10 is fixed to the base plate 18 which is disposed on the lower end of the lens drive device 1. Therefore, a length of the wire 10 can be made relatively long. Accordingly, in this embodiment, the spring constant of the wire 10 is easily set and a degree of freedom in design of the wire 10 can be enhanced.

In this embodiment, the outer peripheral face of the first drive magnet 23 and the inner peripheral face of the first drive coil 24 are oppositely disposed to each other through a predetermined gap space. Further, opposing faces of the first drive magnet pieces 31 and 32 which are disposed so as to be superposed on each other in the optical axis direction are magnetized in the same magnetic pole. Therefore, the first holding body 2 is driven by utilizing the entire periphery of the first drive magnet 23 and the entire periphery of the first drive coil 24. Further, the magnetic flux density passing through the first drive coil 24 is increased between the opposing faces of the first drive magnet pieces 31 and 32. Therefore, a magnetic circuit for driving the first holding body 2 is efficiently formed and thus the sizes of the first drive magnet 23 and the first drive coil 24 can be reduced while securing a drive force for driving the lens in the optical axis direction. As a result, a weight of the movable portion of the lens drive device 1 can be reduced and responsiveness when focus adjustment of the lens is performed and responsiveness when a shake is corrected can be enhanced.

In this embodiment, the magnetic plate 33 is disposed between two first drive magnet pieces 31 and 32. Therefore, in comparison with a case that air space is provided between the first drive magnet pieces 31 and 32 or, in comparison with a case that a nonmagnetic plate is disposed between the first drive magnet pieces 31 and 32, the magnetic flux density generated from the first drive magnet 23 can be increased effectively.

In this embodiment, when viewed in the optical axis direction, the first drive magnet 23 and the first drive coil 24 are disposed at each of the four corners of the second holding body 3. Therefore, the first drive mechanism 5 is disposed at four corners, which tend to be dead spaces, of the second holding body 3 formed so that its shape when viewed in the optical axis direction is a substantially square shape. Accordingly, in this embodiment, the size of the second holding body 3 can be reduced and, as a result, the size of the lens drive device 1 can be reduced. Further, the first holding body 2 can be moved in the optical axis direction in a well-balanced manner by the first drive magnets 23 and the first drive coils 24 which are disposed at four corners of the second holding body 3. Therefore, when the lens is driven in the optical axis direction by the first drive mechanism 5, the inclination of the optical axis "L" of the lens can be restrained.

In this embodiment, the second drive magnet 25 and the second drive coil 26 are formed and disposed so that each of four magnetic poles of the opposing face 25a of the second drive magnet 25 and each of four long side parts 26a of two second drive coils 26 adjacently disposed to each other in the right and left direction are faced each other. Therefore, a drive force in the right and left direction for the second holding body 3 can be obtained by utilizing two long side parts 26a of one second drive coil 26. Accordingly, a drive force in the right and left direction for the second holding body 3 can be increased. Similarly, in this embodiment, the third drive magnet 27 and the third drive coil 28 are formed and disposed so that each of four magnetic poles of the opposing face 27a of the third drive magnet 27 and each of four long side parts 28a of two third drive coils 28 adjacently disposed to each other in the front and rear direction are faced each other. Therefore, a drive force in the front and rear direction for the second holding body 3 can be obtained by utilizing two long side parts 28a of one third drive coil 28 and thus a drive force in the front and rear direction for the second holding body 3 can be increased. As a result, in this embodiment, responsiveness when a shake is corrected can be enhanced.

Especially, in this embodiment, the opposing face 25a of the second drive magnet 25 to the second drive coil 26 is magnetized in four poles so that an "N"-pole and an "S"-pole are alternately disposed and thus the magnetic flux density in the opposing face 25a of the second drive magnet 25 can be increased. Therefore, a drive force in the right and left direction of the second holding body 3 can be increased effectively. Similarly, the opposing face 27a of the third drive magnet 27 to the third drive coil 28 is magnetized in four poles so that an "N"-pole and an "S"-pole are alternately disposed and thus the magnetic flux density in the opposing face 27a of the third drive magnet 27 can be increased and, as a result, a drive force in the front and rear direction of the second holding body 3 can be increased effectively. Accordingly, in this embodiment, responsiveness when a shake is corrected can be further enhanced.

In this embodiment, the second drive magnet 25 and the second drive coil 26 which are formed in a flat plate shape are disposed so that their thickness directions are set to be the front and rear direction and they are oppositely disposed to each other in the front and rear direction, and the third drive magnet 27 and the third drive coil 28 which are formed in a flat plate shape are disposed so that their thickness directions are set to be the right and left direction and they are oppositely disposed to each other in the right and left direction. Therefore, in this embodiment, the size of the lens drive device 1 can be reduced in the optical axis direction and the size of the lens drive device 1 can be also reduced in the front, rear, right and left directions.

In this embodiment, when a force is applied to a movable portion of the second holding body 3 or the like in the lower direction, the wire fixing part 8d is elastically deformed in the lower direction with a force smaller than a buckling load of the wire 10. Therefore, even when an impact is applied to the lens drive device 1 in the optical axis direction due to dropping or the like, the wire fixing part 8d is elastically deformed in the lower direction and thus buckling of the wire 10 is prevented. Especially, in this embodiment, when the wire fixing part 8d is deformed to the lower direction, the abutting member 21 is abutted with the under face of the second holding body 3 before the wire 10 is buckled and thus buckling of the wire 10 is surely prevented by the wire fixing part 8d and the abutting member 21. Therefore, in this embodiment, impact resistance of the lens drive device 1 is enhanced.

In this embodiment, when viewed in the upper and lower direction, the wire 10 is disposed in each of the vicinities of four corners of the second holding body 3 and the abutting member 21 is fixed at each of the vicinities of four corners of the coil fixing member 19. In other words, in this embodiment, the abutting member 21 is disposed in the vicinity of the wire 10. Therefore, when the wire fixing part 8d is deformed to the lower direction and the abutting member 21 is abutted with the under face of the second holding body 3, the stress is hard to be applied to the wire 10 in the axial direction. Accordingly, in this embodiment, buckling of the wire 10 can be further surely prevented by the abutting member 21.

In this embodiment, the abutting member 21 is fixed to the upper face of the coil fixing member 19. Therefore, in comparison with a case that the abutting member 21 is fixed to a lower end side of the second holding body 3, the weight of a movable portion of the lens drive device 1 is reduced. As a result, responsiveness of the lens when a shake is corrected is enhanced.

In this embodiment, the wire fixing part 8d which structures the plate spring 8 functions to prevent buckling of the wire 10. Therefore, in this embodiment, in comparison with a case that a member having a function for supporting the first holding body 2 and a member having a function for preventing buckling of the wire 10 are separately provided from each other, the structure of the lens drive device 1 can be simplified and handling of components when the lens drive device 1 is to be assembled is easy.

In this embodiment, the arm part 8c which acts as a spring part for supporting the first holding body 2 is formed to connect the first fixing part 8a which is disposed on the inner side in the radial direction with respect to the second fixing part 8b with the second fixing part 8b. Further, in this embodiment, the wire fixing part 8d is formed so as to protrude toward an outer side in the radial direction from the second fixing part 8b. Therefore, even when the plate spring 8 is provided with a function which supports the first holding body 2 and a function which prevents buckling of the wire 10, a support function for the first holding body 2 by the arm part 8c and a buckling preventing function for the wire 10 by the wire fixing part 8d are separated from each other through the second fixing part 8b which is fixed to the second holding body 3. Accordingly, in this embodiment, both of the support function for the first holding body 2 and the buckling preventing function for the wire 10 are operated appropriately.

In this embodiment, both end parts of the first drive coil 24 are fixed to the respective first fixing parts 8a of two plate springs 8 and the upper end of the wire 10 is fixed to the wire fixing part 8d of the plate spring 8. Further, one of the two wires 10 fixed to the plate spring 8 and the plate spring 8 serve as a power supply function for supplying an electric current to the first drive coils 24 from the base plate 18. In other words, the wire fixing part 8d serves as a power supply function for supplying an electric current to the first drive coils 24 from the base plate 18. Therefore, in this embodiment, the wire fixing part 8d provides a buckling preventing function for the wire 10 and a power supply function to the first drive coil 24. In other words, a structure for preventing buckling of the wire 10 and a structure for supplying an electric current to the first drive coil 24 are not required to provide separately. Therefore, in this embodiment, a structure of the lens drive device 1 can be simplified.

(Principal Modified Embodiments of Second Drive Mechanism and Third Drive Mechanism)

Figure 11A:
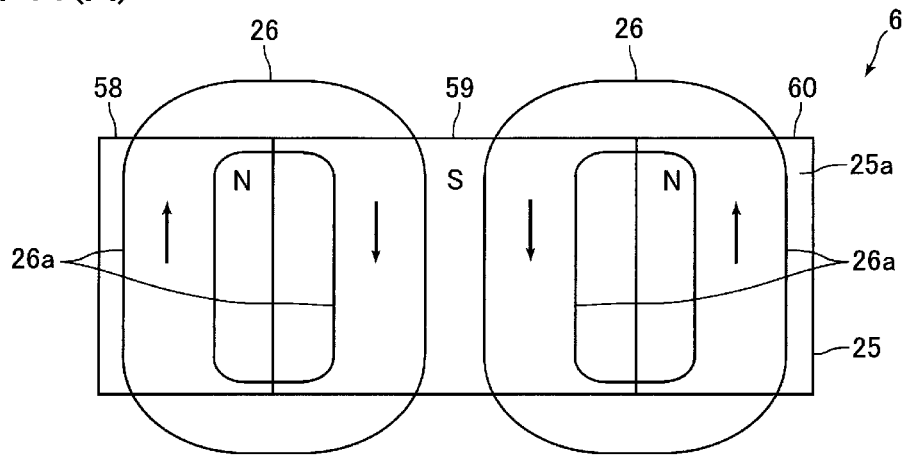
FIGS. 11(A), 11(B) and 11(C) are explanatory views showing a structure of a second drive mechanism in accordance with another embodiment of the present invention.
Figure 11B:
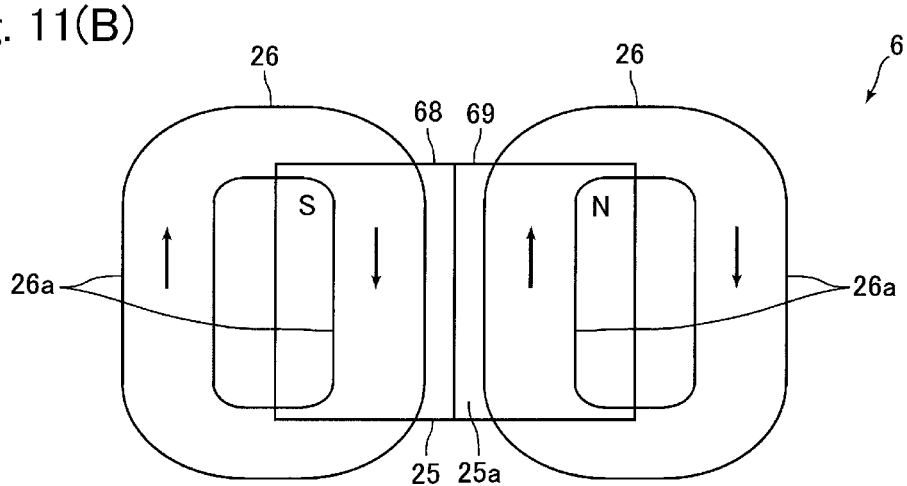
Figure 11C:
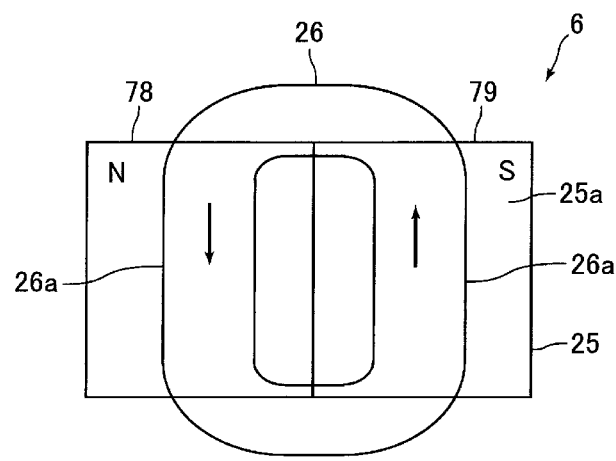
Figure 12:
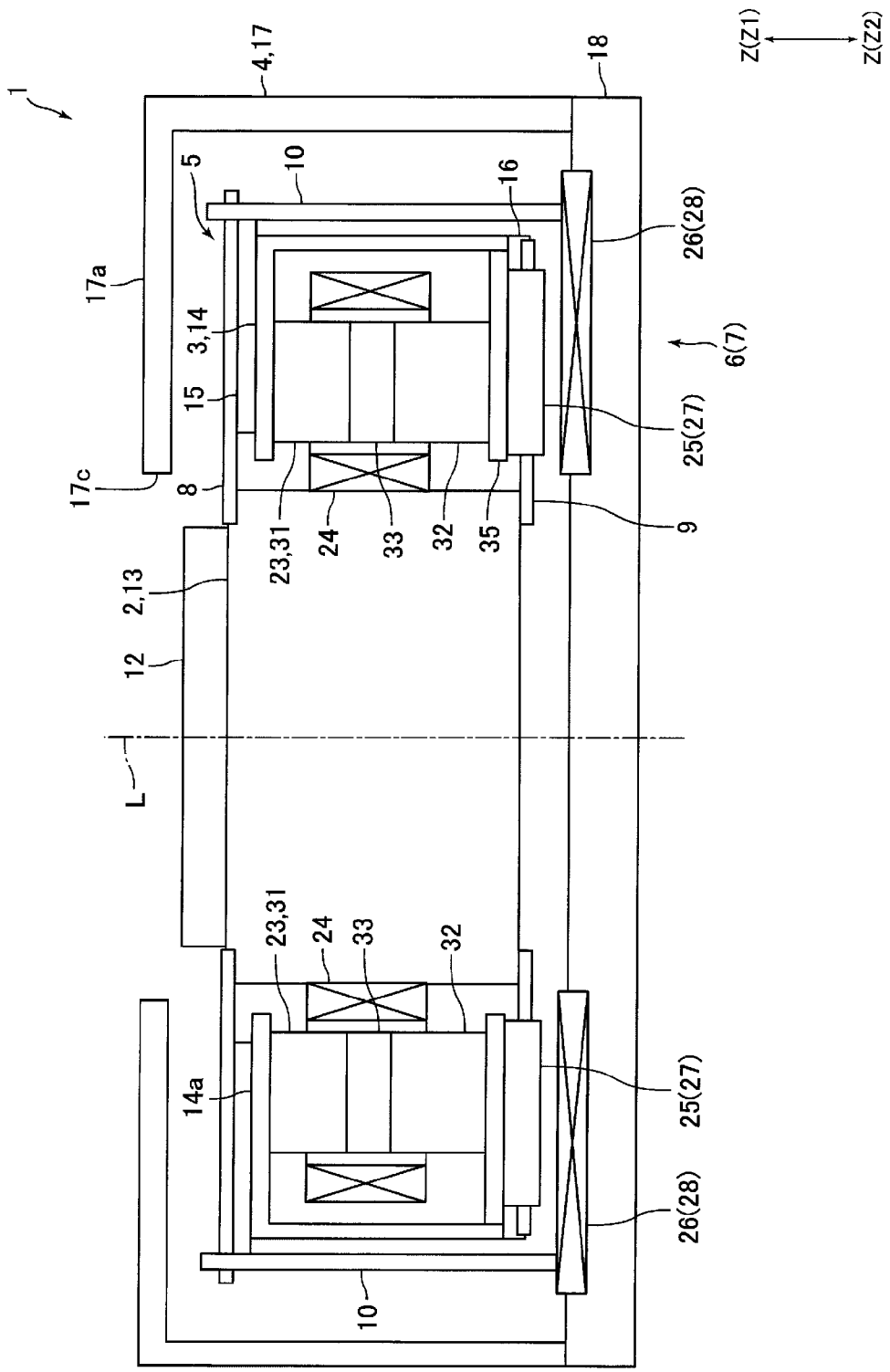
FIG. 12 is a schematic side view showing a schematic structure of a lens drive device including a second drive mechanism in accordance with another embodiment of the present invention.

FIGS. 11(A), 11(B) and 11(C) are explanatory views showing a structure of a second drive mechanism 6 in accordance with another embodiment of the present invention. FIG. 12 is a schematic side view showing a schematic structure of a lens drive device 1 including a second drive mechanism 6 in accordance with another embodiment of the present invention.

In the embodiment described above, the opposing face 25a of the second drive magnet 25 to the second drive coil 26 is magnetized in four poles so that an "N"-pole and an "S"-pole are alternately disposed. However, the present invention is not limited to this embodiment. For example, as shown in FIG. 11(A), the opposing face 25a of the second drive magnet 25 to the second drive coil 26 may be magnetized in three poles so that an "N"-pole and an "S"-pole are alternately disposed. For example, the second drive magnet 25 may be structured of a second drive magnet piece 58 whose opposing face to the second drive coil 26 is magnetized in an "N"-pole, a second drive magnet piece 59 whose opposing face to the second drive coil 26 is magnetized in an "S"-pole, and a second drive magnet piece 60 whose opposing face to the second drive coil 26 is magnetized in an "N"-pole.

In this case, the second drive magnet 25 and the second drive coil 26 are formed and disposed so that a long side part 26a on a left side of the second drive coil 26 disposed on the left side in FIG. 11(A) faces the second drive magnet piece 58, a long side part 26a on a right side of the second drive coil 26 disposed on the left side in FIG. 11(A) and a long side part 26a on the left side of the second drive coil 26 disposed on the right side in FIG. 11(A) face the second drive magnet piece 59, and a long side part 26a on the right side of the second drive coil 26 disposed on the right side in FIG. 11(A) faces the second drive magnet piece 60. Further, in this case, winding directions of the two second drive coils 26 adjacently disposed in the right and left direction are different from each other. For example, the second drive coil 26 disposed on the left side in FIG. 11(A) is wound around in a clockwise direction in FIG. 11(A) and the second drive coil 26 disposed on the right side in FIG. 11(A) is wound around in the counterclockwise direction in FIG. 11(A).

The opposing face 25a of the second drive magnet 25 may be, as shown in FIG. 11(B), magnetized in two poles, i.e., an "N"-pole and an "S"-pole. For example, the second drive magnet 25 may be structured of a second drive magnet piece 68 whose opposing face to the second drive coil 26 is magnetized in an "S"-pole and a second drive magnet piece 69 whose opposing face to the second drive coil 26 is magnetized in an "N"-pole.

In this case, the second drive magnet 25 and the second drive coil 26 are formed and disposed so that a long side part 26a on the right side of the second drive coil 26 disposed on the left side in FIG. 11(B) faces the second drive magnet piece 68 and a long side part 26a on the left side of the second drive coil 26 disposed on the right side in FIG. 11(B) faces the second drive magnet piece 69. Further, in this case, winding directions of the two second drive coils 26 adjacently disposed in the right and left direction are the same as each other.

Further, the opposing face 25a of the second drive magnet 25 may be magnetized in a single pole. In this case, a long side part 26a on the right side of the second drive coil 26 disposed on the left side and a long side part 26a on the left side of the second drive coil 26 disposed on the right side are faced the opposing face 25a which is magnetized in a single pole. Further, in this case, winding directions of the two second drive coils 26 adjacently disposed in the right and left direction are different from each other.

Similarly, in the embodiment described above, the opposing face 27a of the third drive magnet 27 to the third drive coil 28 is magnetized in four poles so that an "N"-pole and an "S"-pole are alternately disposed. However, similarly to the opposing face 25a of the second drive magnet 25, the opposing face 27a of the third drive magnet 27 may be magnetized in three poles, in two poles or in a single pole. In these cases, a facing relationship of the third drive magnet 27 to the third drive coil 28 is the same as the facing relationship of the second drive magnet 25 to the second drive coil 26.

In the embodiment described above, two second drive coils 26 are adjacently disposed to each other in the right and left direction on each of the front face side and the rear face side of the magnet fixing member 14. However, the present invention is not limited to this embodiment. For example, one piece of the second drive coil 26 may be disposed on each of the front face side and the rear face side of the magnet fixing member 14. In this case, as shown in FIG. 11(C), the opposing face 25a of the second drive magnet 25 is magnetized in two poles. Further, the second drive magnet 25 and the second drive coil 26 are formed and disposed so that a long side part 26a on the left side of the second drive coil 26 faces an opposing face of the second drive magnet piece 78 magnetized in an "N"-pole and a long side part 26a on the right side of the second drive coil 26 faces an opposing face of the second drive magnet piece 79 magnetized in an "S"-pole. In this case, when viewed in the upper and lower direction, two sets of the second drive magnet 25 and the second drive coil 26 comprised of one piece of the second drive magnet 25 and one piece of the second drive coil 26 facing each other may be substantially point-symmetrically disposed with respect to the mechanical gravity center of the second holding body 3. However, it is preferable that the two sets of the second drive magnet 25 and the second drive coil 26 are substantially line-symmetrically disposed with respect to a line which passes through the mechanical gravity center of the second holding body 3 and is parallel to the right and left direction.

Similarly, in the embodiment described above, two pieces of the third drive coil 28 are adjacently disposed to each other in the front and rear direction on each of the right face side and the left face side of the magnet fixing member 14. However, one piece of the third drive coil 26 may be disposed on each of the right face side and the left face side of the magnet fixing member 14. In this case, a facing relationship of the third drive magnet 27 to the third drive coil 28 is the same as a facing relationship of the second drive magnet 25 to the second drive coil 26. Also in this case, when viewed in the upper and lower direction, two sets of the third drive magnet 27 and the third drive coil 28 comprised of one piece of the third drive magnet 27 and one piece of the third drive coil 28 facing each other may be substantially point-symmetrically disposed with respect to the mechanical gravity center of the second holding body 3. However, it is preferable that the two sets of the third drive magnet 27 and the third drive coil 28 are substantially line-symmetrically disposed with respect to a line which passes through the mechanical gravity center of the second holding body 3 and is parallel to the front and rear direction.

Further, three pieces of the second drive coil 26 may be adjacently disposed to each other in the right and left direction on each of the front face side and the rear face side of the magnet fixing member 14. In this case, in order to increase a drive force of the second holding body 3 in the right and left direction, it is preferable that an opposing face 25a of the second drive magnet 25 is magnetized in six poles so that an "N"-pole and an "S"-pole are alternately disposed and that the second drive magnet 25 and the second drive coil 26 are disposed so that each of six magnetic poles of the opposing face 25a of the second drive magnet 25 faces each of six long side parts 26a which are juxtaposed in the right and left direction. In this case, when viewed in the upper and lower direction, two sets of the second drive magnet 25 and the second drive coil 26 comprised of one piece of the second drive magnet 25 and three pieces of the third drive coil 28 facing each other may be substantially point-symmetrically disposed with respect to the mechanical gravity center of the second holding body 3. However, it is preferable that the two sets of the second drive magnet 25 and the second drive coil 26 are substantially line-symmetrically disposed with respect to a line which passes through the mechanical gravity center of the second holding body 3 and is parallel to the right and left direction.

Similarly, three pieces of the third drive coil 28 may be adjacently disposed to each other in the front and rear direction on each of the right face side and the left face side of the magnet fixing member 14. Also in this case, in order to increase a drive force of the second holding body 3 in the front and rear direction, it is preferable that an opposing face 27a of the third drive magnet 27 is magnetized in six poles so that an "N"-pole and an "S"-pole are alternately disposed and that the third drive magnet 27 and the third drive coil 28 are disposed so that each of six magnetic poles of the opposing face 27a of the third drive magnet 27 faces each of six long side parts 28a which are juxtaposed in the right and left direction. Further, also in this case, when viewed in the upper and lower direction, two sets of the third drive magnet 27 and the third drive coil 28 comprised of one piece of the third drive magnet 27 and three pieces of the third drive coil 28 facing each other may be substantially point-symmetrically disposed with respect to the mechanical gravity center of the second holding body 3. However, it is preferable that the two sets of the third drive magnet 27 and the third drive coil 28 are substantially line-symmetrically disposed with respect to a line which passes through the mechanical gravity center of the second holding body 3 and is parallel to the front and rear direction.

Further, four or more second drive coils 26 may be adjacently disposed to each other in the right and left direction on each of the front face side and the rear face side of the magnet fixing member 14, and four or more third drive coils 28 may be adjacently disposed to each other in the front and rear direction on each of the right face side and the left face side of the magnet fixing member 14. Also in a case that four or more second drive coils 26 are adjacently disposed in the right and left direction on each of the front face side and the rear face side of the magnet fixing member 14, in order to increase a drive force of the second holding body 3 in the right and left direction, it is preferable that the second drive magnet 25 and the second drive coils 26 are disposed so that the opposing face 25a of the second drive magnet 25 is magnetized in magnetic poles of a multiple of the number of the second drive coils 26 so that an "N"-pole and an "S"-pole are disposed alternately and that each of a plurality of the magnetic poles of the opposing face 25a of the second drive magnet 25 and each of a plurality of the long side parts 26a juxtaposed in the right and left direction are faced each other. Similarly, also in a case that four or more third drive coils 28 are adjacently disposed in the front and rear direction on each of the right face side and the left face side of the magnet fixing member 14, in order to increase a drive force of the second holding body 3 in the front and rear direction, it is preferable that the third drive magnet 27 and the third drive coils 28 are disposed so that the opposing face 27a of the third drive magnet 27 is magnetized in magnetic poles of a multiple of the number of the third drive coils 28 so that an "N"-pole and an "S"-pole are disposed alternately and that each of a plurality of the magnetic poles of the opposing face 27a of the third drive magnet 27 and each of a plurality of the long side parts 28a juxtaposed in the front and rear direction are faced each other.

In the embodiment described above, the second drive magnet 25 and the second drive coil 26 are disposed so that their thickness directions are substantially parallel to the front and rear direction and they face each other in the front and rear direction. However, the present invention is not limited to this embodiment. For example, the second drive magnet 25 and the second drive coil 26 may be disposed so that their thickness directions are substantially parallel to the optical axis direction and that they face each other in the optical axis direction. In this case, for example, as shown in FIG. 12, the second drive magnet 25 is fixed to an under face of the magnetic member 35 and the second drive coil 26 is fixed to an upper face of the base plate 18. Alternatively, the second drive magnet 25 is fixed to an upper face of the bottom part 14a of the magnet fixing member 14 and the second drive coil 26 is fixed to an under face of the bottom part 17a of the cover member 17.

Similarly, in the embodiment described above, the third drive magnet 27 and the third drive coil 28 are disposed so that their thickness directions are substantially parallel to the right and left direction and they face each other in the right and left direction. However, the third drive magnet 27 and the third drive coil 28 may be disposed so that their thickness directions are substantially parallel to the optical axis direction and that they face each other in the optical axis direction. In this case, for example, the third drive magnet 27 is fixed to an under face of the magnetic member 35 and the third drive coil 28 is fixed to an upper face of the base plate 18. Alternatively, the third drive magnet 27 is fixed to an upper face of the bottom part 14a of the magnet fixing member 14 and the third drive coil 28 is fixed to an under face of the bottom part 17a of the cover member 17.

Other Embodiments

Although the present invention has been shown and described with reference to a specific embodiment, various changes and modifications will be apparent to those skilled in the art from the teachings herein.

In the embodiment described above, the first drive magnet 23, the second drive magnet 25 and the third drive magnet 27 are fixed to the magnet fixing member 14 structuring the second holding body 3. However, the present invention is not limited to this embodiment. For example, the first drive magnet 23, the second drive magnet 25 and the third drive magnet 27 may be fixed to the fixed body 4. In this case, the first drive coil 24 is fixed to the first holding body 2. Further, in this case, the second drive coil 26 and the third drive coil 28 may be fixed to the first holding body 2 or may be fixed to the second holding body 3. Further, the first drive magnet 23, the second drive magnet 25 and the third drive magnet 27 may be fixed to the first holding body 2. In this case, the second drive coil 26 and the third drive coil 28 are fixed to the fixed body 4. Further, in this case, the first drive coil 24 may be fixed to the second holding body 3 or may be fixed to the fixed body 4.

In the embodiment described above, the second holding body 3 is movably supported in the front, rear, right and left directions by the fixed body 4 through the wires 10. However, the present invention is not limited to this embodiment. For example, the second holding body 3 may be movably supported in the front, rear, right and left directions by the fixed body 4 through a plate spring. In this case, the plate spring is, for example, formed so that its shape when viewed in the optical axis direction is a substantially "L"-shape. Further, the plate spring is, for example, disposed at each of four corners of the outer peripheral side of the second holding body 3 so as to be substantially parallel to the right and left direction and the front and rear direction when viewed in the optical axis direction. Further, a width in the optical axis direction of the plate spring is a wider than a thickness of the plate spring in a direction perpendicular to the optical axis direction. For example, a width in the optical axis direction of the plate spring is set to be two times or more of the thickness of the plate spring in the direction perpendicular to the optical axis direction.

In the embodiment described above, the second holding body 3 is supported by the fixed body 4 through four wires 10. However, the present invention is not limited to this embodiment. For example, the second holding body 3 may be supported by the fixed body 4 through three wires 10 or may be supported by the fixed body 4 through five or more wires 10. In order to support the second holding body 3 in a well-balanced manner, it is preferable that the second holding body 3 is supported by an even number of wires 10. Further, in this case, it is preferable that an even number of the wires 10 is substantially point-symmetrically disposed with respect to the center of the drive forces of the second drive mechanism 6 and the third drive mechanism 7.

In the embodiment described above, the upper end of the wire 10 is fixed to the plate spring 8. However, the present invention is not limited to this embodiment. For example, an upper end side of the wire 10 may be fixed to an upper end side of the second holding body 3 such as the spacer 15. Further, in the embodiment described above, the upper end of the wire 10 is fixed to the plate spring 8 and the lower end of the wire 10 is fixed to the base plate 18. However, it may be structured that a lower end side of the wire 10 is fixed to the plate spring 9 and an upper end side of the wire 10 is fixed to a resin member or the like which is fixed to the bottom part 17a of the cover member 17. In this case, for example, a wire fixing part similar to the wire fixing part 8d of the plate spring 8 is formed in the plate spring 9 and a lower end side of the wire 10 is fixed to the wire fixing part. Further, in this case, for example, an abutting member for abutting with the second holding body 3 to prevent buckling of the wire 10 is fixed to the resin member or the like which is fixed to the bottom part 17a of the cover member 17.

In the embodiment described above, the lens drive device 1 is formed in a substantially square shape when viewed in the optical axis direction. However, the present invention is not limited to this embodiment. For example, the lens drive device 1 may be formed in a roughly rectangular shape when viewed in the optical axis direction or may be formed in another roughly quadrangular shape. Further, the lens drive device 1 may be formed in a roughly polygonal shape other than a roughly rectangular shape when viewed in the optical axis direction or may be formed in a roughly circular shape or a roughly elliptic shape when viewed in the optical axis direction.

In the embodiment described above, the first drive magnet 23 is formed in a substantially triangular prism shape but the first drive magnet 23 may be formed in a roughly polygonal prism shape other than a triangular prism shape or may be formed in a roughly cylindrical shape or a roughly elliptic columnar shape. Further, in the embodiment described above, the first drive coil 24 is wound around in a roughly triangular shape but the first drive coil 24 may be wound around in a roughly multi-angular tube shape other than a roughly triangular shape or may be wound around in a roughly cylindrical tube shape or in a roughly elliptic tube shape.

In the embodiment described above, the magnetic plate 33 is disposed between the opposing faces of the first drive magnet pieces 31 and 32. However, the present invention is not limited to this embodiment. For example, the magnetic plate 33 is not disposed between the opposing faces of the first drive magnet pieces 31 and 32. In other words, a gap space may be formed between the opposing faces of the first drive magnet pieces 31 and 32, a nonmagnetic plate may be disposed between the opposing faces of the first drive magnet pieces 31 and 32, or the opposing faces of the first drive magnet pieces 31 and 32 may be abutted with each other.

In the embodiment described above, the first drive mechanism 5 is structured of the first drive magnet 23 formed in a substantially triangular prism shape, the first drive coil 24 which is disposed so that its inner peripheral face is oppositely disposed to the outer peripheral face of the first drive magnet 23 through a predetermined gap space, and the like. However, the present invention is not limited to this embodiment. For example, the first drive mechanism may be structured of a drive coil which is wound around in a substantially flat shape, a drive magnet which is disposed so as to face the drive coil, and the like. Alternatively, the first drive mechanism may be structured of an electromagnet provided with an iron core around which a coil is wound and a permanent magnet. Further, similarly, the second drive mechanism 6 and/or the third drive mechanism 7 may be structured of an electromagnet provided with an iron core around which a coil is wound and a permanent magnet. Alternatively, similarly to the first drive mechanism 5, the second drive mechanism 6 and/or the third drive mechanism 7 may be structured of a second drive magnet and a third drive magnet which are formed in a roughly prism shape and a second drive coil and a third drive coil which are wound around in a roughly tube shape.

In the embodiment described above, the second drive magnet 25 and the third drive magnet 27 are structured of four second drive magnet pieces 38 through 41. However, the present invention is not limited to this embodiment. For example, the second drive magnet 25 and/or the third drive magnet 27 may be structured of one second drive magnet piece. Also in this case, the opposing face 25a of the second drive magnet 25 and/or the opposing face 27a of the third drive magnet 27 are magnetized in four poles so that an "N"-pole and an "S"-pole are disposed alternately.

In the embodiment described above, the second drive coil 26 and the third drive coil 28 are an air-core coil which is wound around in a roughly rectangular shape. However, the present invention is not limited to this embodiment. For example, the second drive coil 26 and/or the third drive coil 28 may be a pattern coil which is structured of a coil pattern printed or laminated on a base plate.

In the embodiment described above, four side faces of the lens drive device 1 when viewed in the optical axis direction are substantially parallel to the right and left direction or the front and rear direction and the second drive mechanism 6 drives the second holding body 3 in the right and left direction and the third drive mechanism 7 drives the second holding body 3 in the front and rear direction. However, the present invention is not limited to this embodiment. For example, it may be structured that the second drive mechanism 6 drives the second holding body 3 in a predetermined direction which is substantially perpendicular to the optical axis direction and is inclined with respect to the right and left direction and the third drive mechanism 7 drives the second holding body 3 in a direction which is substantially perpendicular to the predetermined direction and the optical axis direction. For example, it may be structured that the second drive mechanism 6 drives the second holding body 3 in a direction which is substantially perpendicular to the optical axis direction and is inclined by +45° with respect to the right and left direction and the third drive mechanism 7 drives the second holding body 3 in a direction which is substantially perpendicular to the optical axis direction and is inclined by −45° with respect to the right and left direction In the embodiment described above, when viewed in the upper and lower direction, the mechanical gravity center of the first holding body 2, the mechanical gravity center of the second holding body 3 and the mechanical gravity center of the fixed body 4 are substantially coincided with the optical axis "L". However, the present invention is not limited to this embodiment. For example, when viewed in the upper and lower direction, the mechanical gravity center of the first holding body 2, the mechanical gravity center of the second holding body 3, and/or the mechanical gravity center of the fixed body 4 may be displaced from the optical axis "L". Further, in the embodiment described above, when viewed in the upper and lower direction, the center of the drive forces of the first drive mechanisms 5, the center of the drive forces of the second drive mechanisms 6 and the center of the drive forces of the third drive mechanisms 7 are substantially coincided with the optical axis "L". However, the center of the drive forces of the first drive mechanisms 5, the center of the drive forces of the second drive mechanisms 6 and/or the center of the drive forces of the third drive mechanisms 7 may be displaced from the optical axis "L". In addition, in the embodiment described above, when viewed in the upper and lower direction, the mechanical gravity center of the first holding body 2, the mechanical gravity center of the second holding body 3 and the mechanical gravity center of the fixed body 4 are substantially coincided with the center of the drive forces of the first drive mechanisms 5, the center of the drive forces of the second drive mechanisms 6 and the center of the drive forces of the third drive mechanisms 7. However, the mechanical gravity center of the first holding body 2, the mechanical gravity center of the second holding body 3 and/or the mechanical gravity center of the fixed body 4 may be displaced from the center of the drive forces of the first drive mechanisms 5, the center of the drive forces of the second drive mechanisms 6 and/or the center of the drive forces of the third drive mechanisms 7.

In the embodiment described above, the wire fixing part 8d of the plate spring 8 functions as a buckling prevention member for preventing buckling of the wire 10. However, the present invention is not limited to this embodiment. For example, it may be structured that a plate spring provided with a function similar to the wire fixing part 8d is separately formed from the plate spring 8 as a buckling prevention member and this plate spring is fixed to an upper end side of the second holding body 3 (for example, an upper face of the spacer 15) and an upper end side of the wire 10 is fixed to the plate spring. Alternatively, an upper end side of the second holding body 3 and an upper end side of the wire 10 may be connected with each other through a buckling prevention member formed of elastic material such as rubber or sponge which is elastically deformed in the upper and lower direction by a force smaller than a buckling load of the wire 10.

In the embodiment described above, the upper end of the second holding body 3 and the upper end of the wire 10 are connected with each other through the wire fixing part 8d which is the buckling prevention member. However, the present invention is not limited to this embodiment. For example, a lower end side of the fixed body 4 and a lower end side of the wire 10 may be connected with each other through a buckling prevention member for preventing buckling of the wire 10. For example, the base plate 18 and a lower end side of the wire 10 may be connected with each other through a plate spring having a function similar to the wire fixing part 8d. In this case, the upper end of the wire 10 may be, similarly to the embodiment described above, fixed to the wire fixing part 8d. Further, in this case, an upper end side of the wire 10 may be directly fixed to the second holding body 3 without forming the wire fixing part 8d in the plate spring 8. Further, a lower end side of the fixed body 4 and a lower end side of the wire 10 may be connected with each other through a buckling prevention member formed of elastic material such as rubber or sponge which is elastically deformed in the upper and lower direction by a force smaller than a buckling load of the wire 10.

In accordance with an embodiment of the present invention, it may be structured that a fixing member to which the abutting member 21 is fixed is provided separately and the fixing member is disposed on a lower side of the base plate 18 and a buckling prevention member in a sheet-like shape which is formed of elastic material such as rubber or sponge elastically deformed in the upper and lower direction by a force smaller than a buckling load of the wire 10 may be disposed between the fixing member and the base plate 18.

In the embodiment described above, the wire 10 is disposed so that its longitudinal direction is substantially parallel to the upper and lower direction. However, the present invention is not limited to this embodiment. For example, the wire 10 may be disposed so that its longitudinal direction is inclined with respect to the upper and lower direction. For example, the wire 10 may be disposed so as to extend to an outer side in the radial direction of the lens drive device 1 toward the lower direction. In this case, for example, an inclination of the wire 10 with respect to the upper and lower direction is set to be within about 30°.

Figure 14A:
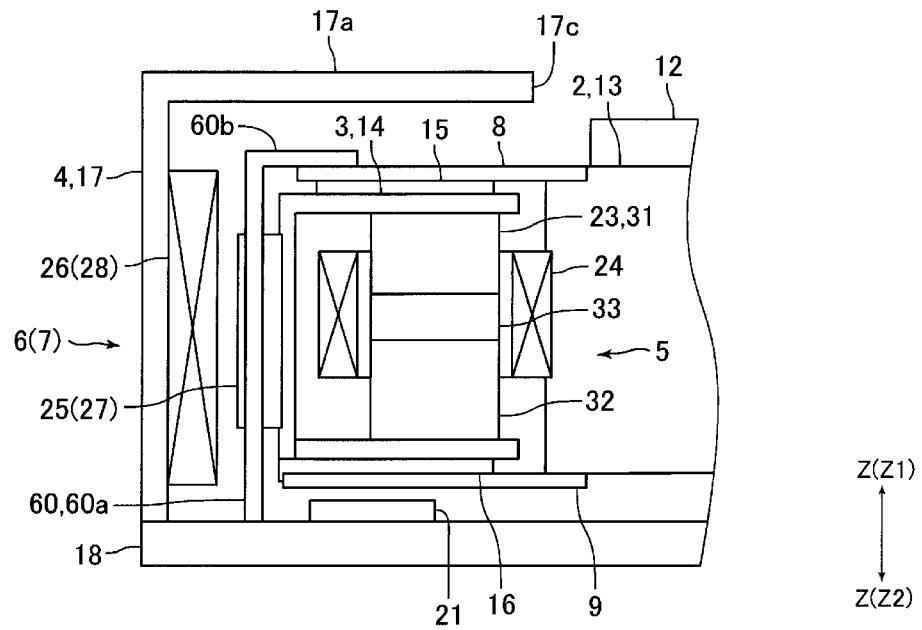
FIGS. 14(A) and 14(B) are a schematic side view showing a schematic structure of a lens drive device including a wire in accordance with another embodiment of the present invention.

In the embodiment described above, the wire 10 is formed in a straight line shape and is disposed so that its longitudinal direction is substantially parallel to the upper and lower direction. However, the present invention is not limited to this embodiment. For example, as shown in FIG. 14(A), a wire 60 which connects the second holding body 3 with the fixing part 4 may be structured of a straight line part 60a, which is formed in a straight line shape and is disposed so that its longitudinal direction is substantially parallel to the upper and lower direction, and a bending part 60b which is bent by substantially 90° from an upper end of the straight line part 60a in a straight line shape. In other words, the wire 60 may be formed in a substantially "L"-shape. In this case, for example, a tip end of the bending part 60b is fixed to a second fixing part 8b without forming the wire fixing part 8d in the plate spring 8.

Figure 14B:
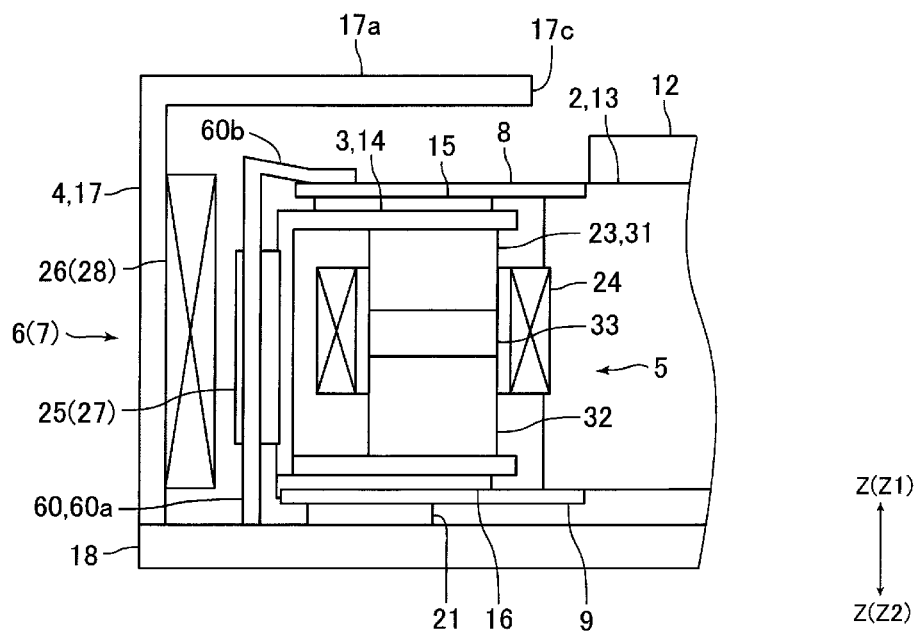

Further, in this case, a diameter of the wire 60 and a length of the bending part 60b may be set so that, when a force is applied to the movable portion of the second holding body 3 or the like in the lower direction, the bending part 60b is elastically deformed to the lower direction by a force smaller than a buckling load of the straight line part 60a with a boundary part between the straight line part 60a and the bending part 60b as a supporting point. In a case that a diameter of the wire 60 and a length of the bending part 60b are set as described above, when a force is applied to the movable portion of the second holding body or the like in a lower direction, as shown in FIG. 14(B), the bending part 60b is elastically deformed to the lower direction before the straight line part 60a is buckled and the buckling of the straight line part 60a is prevented. Therefore, even when the lens drive device 1 is structured as shown in FIGS. 14(A) and 14(B), similarly to the embodiment described above, impact resistance of the lens drive device 1 can be enhanced.

In this case, the bending part 60b is a buckling prevention part which is elastically deformed in the optical axis direction by a force smaller than a buckling load of the straight line part 60a to prevent the buckling of the straight line part 60a. Further, in the example shown in FIGS. 14(A) and 14(B), the bending part 60b is formed so as to be bent at substantially 90° from the upper end of the straight line part 60a. However, the bending part 60b may be formed so as to be bent at an angle smaller than 90° from the upper end of the straight line part 60a or at an angle larger than 90°. Further, in the example shown in FIGS. 14(A) and 14(B), the bending part 60b is formed in a straight line shape but the bending part 60b may be formed in a polygonal line shape or a curved line shape. Further, the straight line part 60a is disposed so that its longitudinal direction is substantially parallel to the upper and lower direction but the straight line part 60a may be disposed so that its longitudinal direction is inclined with respect to the upper and lower direction. For example, the straight line part 60a may be disposed so as to extend to an outer side in the radial direction of the lens drive device 1 toward the lower direction.

Further, it may be structured that a wire is structured of a straight line part, which is formed in a straight line shape and is disposed so that its longitudinal direction is the upper and lower direction, and a bending part which is formed to be bent at substantially 90° from a lower end of the straight line part and the bending part is fixed to a lower end side of the fixed body 4. In this case, when a diameter of the wire and a length of the bending part may be set so that, when a force is applied to the movable portion of the second holding body 3 or the like in the lower direction, the bending part is elastically deformed to the lower direction by a force smaller than a buckling load of the straight line part, an impact resistance of the lens drive device 1 can be enhanced. In accordance with an embodiment of the present invention, it may be structured that a wire is structured of a straight line part, which is formed in a straight line shape and is disposed so that its longitudinal direction is the upper and lower direction, and bending parts which are formed to be bent at substantially 90° from both of an upper end and a lower end of the straight line part, and the bending part connected with the upper end of the straight line part is fixed to an upper end side of the second holding body 3 and the bending part connected with the lower end of the straight line part is fixed to a lower end side of the fixed body 4.

In the embodiment described above, the abutting member 21 is fixed to each of the vicinities of four corners of the coil fixing member 19. However, the present invention is not limited to this embodiment. For example, the abutting member 21 may be fixed at three positions in the vicinities of four corners of the coil fixing member 19. Alternatively, the abutting member 21 may be fixed at two positions in the vicinities of four corners of coil fixing member 19. In this case, it is preferable that the abutting member 21 is fixed at two positions on a diagonal line of the coil fixing member 19. Further, the abutting member 21 may be fixed at one position in the vicinities of four corners of the coil fixing member 19. Further, the abutting member 21 may be fixed at a portion other than the vicinities of four corners of the coil fixing member 19.

In the embodiment described above, the abutting member 21 is fixed to the upper face of the coil fixing member 19. However, the present invention is not limited to this embodiment. For example, when the wire fixing part 8d is elastically deformed in the lower direction and thereby the buckling of the wire 10 is surely prevented, the abutting member 21 is not required to be fixed to the upper face of the coil fixing member 19.

In accordance with an embodiment of the present invention, it may be structured that the first drive magnet 23 is fixed to the magnet fixing member 14 and the second drive magnet 25 and the third drive magnet 27 are fixed to the fixed body 4 or the first holding body 2. Further, it may be structured that the first drive magnet 23 is fixed to the fixed body 4 and the second drive magnet 25 and the third drive magnet 27 are fixed to the magnet fixing member 14 or the first holding body 2. Further, it may be structured that the first drive magnet 23 is fixed to the first holding body 2 and the second drive magnet 25 and the third drive magnet 27 are fixed to the magnet fixing member 14 or the fixed body 4.

In the embodiment described above, the opposing face 25a of the second drive magnet 25 to the second drive coil 26 is magnetized in four poles so that an "N"-pole and an "S"-pole are disposed alternately. However, the present invention is not limited to this embodiment. For example, the opposing face 25a of the second drive magnet 25 to the second drive coil 26 may be magnetized in three poles so that an "N"-pole and an "S"-pole are disposed alternately or may be magnetized in two poles of an "N"-pole and an "S"-pole. Further, the opposing face 25a of the second drive magnet 25 may be magnetized in a single pole. Similarly, the opposing face 27a of the third drive magnet 27 may be magnetized in three poles, may be magnetized in two poles, or may be magnetized in a single pole.

In the embodiment described above, two second drive coils 26 are adjacently disposed to each other in the right and left direction on each of the front face side and the rear face side of the magnet fixing member 14. However, the present invention is not limited to this embodiment. For example, three second drive coils 26 may be adjacently disposed to each other in the right and left direction on each of the front face side and the rear face side of the magnet fixing member 14. In this case, in order to increase a drive force in the right and left direction of the second holding body 3, it is preferable that the opposing face 25a of the second drive magnet 25 is magnetized in six poles so that an "N"-pole and an "S"-pole are disposed alternately and that the second drive magnet 25 and the second drive coils 26 are disposed so that each of six magnetic poles of the opposing face 25a of the second drive magnet 25 faces each of six long side parts 26a juxtaposed in the right and left direction.

Similarly, in the embodiment described above, two third drive coils 28 are adjacently disposed to each other in the front and rear direction on each of the right face side and the left face side of the magnet fixing member 14. However, three third drive coils 28 may be adjacently disposed to each other in the front and rear direction on each of the right face side and the left face side of the magnet fixing member 14. Also in this case, in order to increase a drive force in the front and rear direction of the second holding body 3, it is preferable that the opposing face 27a of the third drive magnet 27 is magnetized in six poles so that an "N"-pole and an "S"-pole are disposed alternately and that the third drive magnet 27 and the third drive coils 28 are disposed so that each of six magnetic poles of the opposing face 27a of the third drive magnet 27 faces each of six long side parts 28a juxtaposed in the right and left direction.

Further, one second drive coil 26 may be disposed on each of the front face side and the rear face side of the magnet fixing member 14 and one third drive coil 28 may be disposed on each of the right face side and the left face side of the magnet fixing member 14. Further, four or more second drive coils 26 may be adjacently disposed to each other in the right and left direction on each of the front face side and the rear face side of the magnet fixing member 14, and four or more third drive coils 28 may be adjacently disposed to each other in the front and rear direction on each of the right face side and the left face side of the magnet fixing member 14.

In the embodiment described above, the second drive magnet 25 and the second drive coil 26 are disposed so that their thickness directions are substantially parallel to the front and rear direction and they face each other in the front and rear direction. However, the present invention is not limited to this embodiment. For example, the second drive magnet 25 and the second drive coil 26 may be disposed so that their thickness directions are substantially parallel to the optical axis direction and they face each other in the optical axis direction. In this case, for example, the second drive magnet 25 is fixed to the under face of the magnetic member 35 and the second drive coil 26 is fixed to the upper face of base plate 18. Alternatively, the second drive magnet 25 is fixed to the upper face of the bottom part 14a of the magnet fixing member 14 and the second drive coil 26 is fixed to the under face of the bottom part 17a of the cover member 17. Similarly, the third drive magnet 27 and the third drive coil 28 may be disposed so that their thickness directions are substantially parallel to the optical axis direction and they face each other in the optical axis direction.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

The invention claimed is:

1. A lens drive device comprising:
   a first holding body which holds a lens and is movable in an optical axis direction of the lens;
   a second holding body which holds the first holding body so that the first holding body is movable in the optical axis direction;
   a fixed body which holds the second holding body so that the second holding body is movable in a first direction and a second direction, the first direction and the second direction being substantially mutually perpendicular and substantially perpendicular to the optical axis direction;
   a first drive mechanism which is structured to drive the first holding body in the optical axis direction;
   a second drive mechanism which is structured to drive the second holding body in the first direction;
   a third drive mechanism which is structured to drive the second holding body in the second direction;
   a plurality of wires which connects the second holding body with the fixed body;
   a buckling prevention member for preventing buckling of the wire; and
   a plate spring which connects the first holding body with the second holding body,
   wherein the wire is formed in a straight line shape,
   wherein the second holding body is supported by the fixed body so as to be movable in the direction substantially perpendicular to the optical axis direction through the plurality of the wires,
      wherein a part of the plate spring is the buckling prevention member;
   wherein the plate spring is provided with a first fixing part which is fixed to the first holding body, a second fixing part which is fixed to the second holding body, an arm part which connects the first fixing part with the second fixing part, and a wire fixing part which is formed so as to be protruded from the second fixing part and to which one end side of the wire is fixed, and
   wherein the wire fixing part is the buckling prevention member; and
   wherein the buckling prevention member is formed of elastic material and is elastically deformed in the optical axis direction by a force smaller than a buckling load of the wire.

2. The lens drive device according to claim 1, wherein
   the first drive mechanism includes a first drive coil and a first drive magnet,
   the second drive mechanism includes a second drive coil and a second drive magnet,
   the third drive mechanism includes a third drive coil and a third drive magnet, and
   the first drive magnet, the second drive magnet and the third drive magnet are fixed to one of the first holding body, the second holding body and the fixed body.

3. The lens drive device according to claim 2, wherein
   the first drive magnet, the second drive magnet and the third drive magnet are fixed to the second holding body,
   the first drive coil is fixed to the first holding body, and
   the second drive coil and the third drive coil are fixed to the fixed body.

4. The lens drive device according to claim 3, wherein the second holding body is provided with a magnet fixing member which is formed of magnetic material and to which the first drive magnet, the second drive magnet and the third drive magnet are fixed.

5. The lens drive device according to claim 4, wherein
   the magnet fixing member is formed in a substantially tube shape,
   the first drive magnet is disposed on an inner peripheral side of the magnet fixing member, and
   the second drive magnet and the third drive magnet are disposed on an outer peripheral side of the magnet fixing member.

6. The lens drive device according to claim 3, wherein the first holding body and the fixed body are formed of nonmagnetic material.

7. The lens drive device according to claim 3, wherein
   the first support member includes a plate spring which is disposed so that a thickness direction of the plate spring is the optical axis direction, and
   the second support member includes a plurality of wires which are disposed so that a longitudinal direction of the wire is the optical axis direction.

8. The lens drive device according to claim 3, wherein
   the second support member includes three or more wires which are disposed so that a longitudinal direction of the wire is the optical axis direction, and
   an electric current is supplied to the first drive coil through the wire.

9. The lens drive device according to claim 8, wherein
   the first support member includes two or more plate springs which are disposed so that a thickness direction of the plate spring is the optical axis direction,
   each of both end parts of the first drive coil is separately fixed to one of the plate springs,
   at least one of the wires is fixed to each of the two plate springs to which each of the both end parts of the first drive coil is fixed, and
   an electric current is supplied to the first drive coil through the wire and the plate spring.

10. The lens drive device according to claim 8, wherein
    one end side of the wire is fixed to the second holding body or the plate spring on one end side of the lens drive device in the optical axis direction, and
    an other end side of the wire is fixed to the fixed body on an other end side of the lens drive device in the optical axis direction.

11. The lens drive device according to claim 1, wherein
    the first drive mechanism includes a first drive magnet which is formed in a substantially prism shape and a first drive coil which is wound around in a substantially tube shape and is disposed so that an inner peripheral face of the first drive coil faces an outer peripheral face of the first drive magnet through a predetermined gap space,
    the first drive magnet is provided with two first drive magnet pieces which are formed in a substantially prism shape and are disposed so as to superpose on each other in the optical axis direction, and
    each of opposing faces of the two first drive magnet pieces in the optical axis direction is magnetized in a same magnetic pole.

12. The lens drive device according to claim 11, wherein the first drive magnet includes a magnetic plate which is formed of magnetic material and is disposed between the two first drive magnet pieces in the optical axis direction.

13. The lens drive device according to claim 11, wherein
a shape of the second holding body when viewed in the optical axis direction is a substantially rectangular shape or a substantially square shape, and
when viewed in the optical axis direction, the first drive magnet and the first drive coil are disposed at each of four corners of the second holding body.

14. The lens drive device according to claim 1, wherein
the second drive mechanism includes a second drive magnet which is formed in a substantially flat plate shape and a second drive coil which is wound around in a substantially flat plate shape and is oppositely disposed to a surface of the second drive magnet, and
the third drive mechanism includes a third drive magnet which is formed in a substantially flat plate shape and a third drive coil which is wound around in a substantially flat plate shape and is oppositely disposed to a surface of the third drive magnet.

15. The lens drive device according to claim 14, wherein
the second drive coil is wound around in a substantially rectangular shape having two first straight side parts which are disposed to be substantially parallel to the optical axis direction,
an opposing face of the second drive magnet to the second drive coil is magnetized so that different magnetic poles respectively face the two first straight side parts,
the third drive coil is wound around in a substantially rectangular shape having two second straight side parts which are disposed to be substantially parallel to the optical axis direction, and
an opposing face of the third drive magnet to the third drive coil is magnetized so that different magnetic poles respectively face the two second straight side parts.

16. The lens drive device according to claim 14, wherein
a shape of the lens drive device when viewed in the optical axis direction is a substantially rectangular shape or a substantially square shape,
an outer peripheral face of the lens drive device when viewed in the optical axis direction is formed to be substantially parallel to the first direction or the second direction,
the second drive magnet and the second drive coil are disposed so that their thickness directions are the second direction and the second drive magnet and the second drive coil face each other in the second direction, and
the third drive magnet and the third drive coil are disposed so that their thickness directions are the first direction and the third drive magnet and the third drive coil face each other in the first direction.

17. The lens drive device according to claim 1, wherein the wire is disposed so that its longitudinal direction is substantially parallel to the optical axis direction.

18. The lens drive device according to claim 1, further comprising an abutting member which is abutted with the second holding body when the buckling prevention member is elastically deformed in the optical axis direction to prevent buckling of the wire,
wherein the abutting member is formed in or fixed to the fixed body.

19. The lens drive device according to claim 1, wherein the buckling prevention member connects one end side of the wire with the second holding body or the buckling prevention member connects an other end side of the wire with the fixed body.

20. The lens drive device according to claim 1, wherein
the plate spring is comprised of two or more plate springs,
the first drive mechanism includes a first drive magnet, which is fixed to the second holding body or the fixed body, and a first drive coil which is fixed to the first holding body,
each of both end parts of the first drive coil is separately fixed and electrically connected with one of the two or more plate springs, and
at least one of the wires is fixed and electrically connected with each of the two plate springs to which each of the both end parts of the first drive coil is fixed.

21. The lens drive device according to claim 1, wherein
the first support member includes a plate spring which is disposed so that a thickness direction of the plate spring is the optical axis direction, and
the second support member includes a plurality of wires which are disposed so that a longitudinal direction of the wire is the optical axis direction.

22. The lens drive device according to claim 21, wherein
the second support member includes three or more wires which are disposed so that a longitudinal direction of the wire is the optical axis direction, and
an electric current is supplied to the first drive coil through the wire.

23. The lens drive device according to claim 22, wherein
the first support member includes two or more plate springs which are disposed so that a thickness direction of the plate spring is the optical axis direction,
each of both end parts of the first drive coil is separately fixed to one of the plate springs,
at least one of the wires is fixed to each of the two plate springs to which each of the both end parts of the first drive coil is fixed, and
an electric current is supplied to the first drive coil through the wire and the plate spring.

24. The lens drive device according to claim 22, wherein
the fixed body includes a circuit board which is formed with a circuit pattern for power supply for supplying an electric current to the first drive coil, and
the wire is connected and fixed to the circuit pattern of the circuit board.

25. The lens drive device according to claim 21, wherein
one end side of the wire is fixed to the second holding body or the plate spring on one end side of the lens drive device in the optical axis direction, and
an other end side of the wire is fixed to the fixed body on an other end side of the lens drive device in the optical axis direction.

* * * * *